(12) United States Patent
Nose

(10) Patent No.: US 11,047,429 B2
(45) Date of Patent: Jun. 29, 2021

(54) FOUR-WHEEL DRIVE VEHICLE

(71) Applicant: TOYOTA JIDOSHA KABUSHIKI KAISHA, Toyota (JP)

(72) Inventor: Mai Nose, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 196 days.

(21) Appl. No.: 16/532,813

(22) Filed: Aug. 6, 2019

(65) Prior Publication Data

US 2020/0049210 A1 Feb. 13, 2020

(30) Foreign Application Priority Data

Aug. 9, 2018 (JP) .............................. JP2018-150904

(51) Int. Cl.
| | |
|---|---|
| *F16D 23/02* | (2006.01) |
| *F02D 41/02* | (2006.01) |
| *B60K 17/354* | (2006.01) |
| *B60K 17/02* | (2006.01) |
| *B60W 10/02* | (2006.01) |
| *F16D 48/06* | (2006.01) |
| *F16D 11/14* | (2006.01) |
| *F16D 23/06* | (2006.01) |

(52) U.S. Cl.
CPC .............. *F16D 23/02* (2013.01); *B60K 17/02* (2013.01); *B60K 17/354* (2013.01); *B60W 10/02* (2013.01); *F02D 41/022* (2013.01); *F16D 11/14* (2013.01); *F16D 48/064* (2013.01); *F16D 2023/0687* (2013.01)

(58) Field of Classification Search
CPC ........ F16D 23/02; F16D 11/14; F16D 48/064; B60K 17/02; B60K 17/354
See application file for complete search history.

(56) References Cited

U.S. PATENT DOCUMENTS

| | | | |
|---|---|---|---|
| 2017/0036540 A1* | 2/2017 | Yoshimura | .............. F16D 21/08 |
| 2017/0182886 A1* | 6/2017 | Horie | ................... B60K 17/354 |
| 2018/0281593 A1* | 10/2018 | Yuasa | ................... F16D 48/064 |

FOREIGN PATENT DOCUMENTS

JP     2017-114460 A     6/2017

* cited by examiner

*Primary Examiner* — Huan Le
(74) *Attorney, Agent, or Firm* — Oliff PLC

(57) ABSTRACT

A four-wheel drive vehicle comprises: main drive wheels; sub-drive wheels; a power transmission path; a first connecting/disconnecting device; and a second connecting/disconnecting device, at least one connecting/disconnecting device of the first and second connecting/disconnecting devices including: a dog clutch; a synchronization mechanism; and an electromagnetic actuator. The four-wheel drive vehicle includes a control device providing the energization control of the electromagnetic coil based on a preliminarily stored current command value to engage the dog clutch of the one connecting/disconnecting device, and the control device learns a characteristic value indicative of an increasing characteristic of the rotation speed of the first rotating member with respect to the current command value and updates the current command value such that an increase rate of the rotation speed of the first rotating member becomes equal to a predetermined rate based on the learned characteristic value.

18 Claims, 20 Drawing Sheets

| OIL TEMPERATURE T (°C) | -40 | -30 | -20 | ... | T-10 | T | T+10 | ... | 130 | 140 |
|---|---|---|---|---|---|---|---|---|---|---|
| SECOND RING GEAR INCREASED SPEED $N_T$ | $N_{-40}$ | $N_{-30}$ | $N_{-20}$ | ... | $N_{T-10}$ | $N_T$ | $N_{T+10}$ | ... | $N_{130}$ | $N_{140}$ |
| CURRENT COMMAND VALUE $I_T$ (A) | $I_{-40}$ | $I_{-30}$ | $I_{-20}$ | ... | $I_{T-10}$ | $I_T$ | $I_{T+10}$ | ... | $I_{130}$ | $I_{140}$ |

| OIL TEMPERATURE T (°C) | −40 | −30 | −20 | ... | T−10 | T | T+10 | ... | 130 | 140 |
|---|---|---|---|---|---|---|---|---|---|---|
| SECOND RING GEAR INCREASED SPEED $N_T{}^d$ | $N_{-40}{}^d$ | $N_{-30}{}^d$ | $N_{-20}{}^d$ | ... | $N_{T-10}{}^d$ | $N_T{}^d$ | $N_{T+10}{}^d$ | ... | $N_{130}{}^d$ | $N_{140}{}^d$ |
| CURRENT COMMAND VALUE $I_T{}^d$ (A) | $I_{-40}{}^d$ | $I_{-30}{}^d$ | $I_{-20}{}^d$ | ... | $I_{T-10}{}^d$ | $I_T{}^d$ | $I_{T+10}{}^d$ | ... | $I_{130}{}^d$ | $I_{140}{}^d$ |

| OIL TEMPERATURE T (°C) | −40 | −30 | −20 | ... | T−10 | T | T+10 | ... | 130 | 140 |
|---|---|---|---|---|---|---|---|---|---|---|
| ELAPSED TIME tT (sec) | t−40 | t−30 | t−20 | ... | tT−10 | tT | tT+10 | ... | t130 | t140 |
| CURRENT COMMAND VALUE IT (A) | I−40 | I−30 | I−20 | ... | IT−10 | IT | IT+10 | ... | I130 | I140 |

| OIL TEMPERATURE T (°C) | -40 | -30 | -20 | ... | T-10 | T | T+10 | ... | 130 | 140 |
|---|---|---|---|---|---|---|---|---|---|---|
| ELAPSED TIME tT (sec) | $t_{-40}^d$ | $t_{-30}^d$ | $t_{-20}^d$ | ... | $t_{T-10}^d$ | $t_T^d$ | $t_{T+10}^d$ | ... | $t_{130}^d$ | $t_{140}^d$ |
| CURRENT COMMAND VALUE IT (A) | $I_{-40}^d$ | $I_{-30}^d$ | $I_{-20}^d$ | ... | $I_{T-10}^d$ | $I_T^d$ | $I_{T+10}^d$ | ... | $I_{130}^d$ | $I_{140}^d$ |

FOUR-WHEEL DRIVE VEHICLE

This application claims priority from Japanese Patent Application No. 2018-150904 filed on Aug. 9, 2018, the disclosure of which is incorporated herein by reference in its entirety.

FIELD OF THE INVENTION

The present invention relates to a technique related to a four-wheel drive vehicle including a first connecting/disconnecting device and a second connecting/disconnecting device for reducing a sound emitted from a dog clutch disposed in one connecting/disconnecting device of the first and second connecting/disconnecting devices when the dog clutch is engaged and reducing a time required until the dog clutch is engaged.

DESCRIPTION OF THE RELATED ART

There is known a four-wheel drive vehicle comprising: (a) main drive wheels to which a drive power from a drive power source is transmitted; (b) sub-drive wheels to which a portion of the drive power from the drive power source is transmitted during four-wheel drive running; (c) a power transmission path transmitting the drive power from the drive power source to the sub-drive wheels; (d) a first connecting/disconnecting device selectively disconnecting or connecting between the power transmission path and the drive power source; and (e) a second connecting/disconnecting device selectively disconnecting or connecting between the power transmission path and the sub-drive wheels, and (f) at least one connecting/disconnecting device of the first and second connecting/disconnecting devices includes (f-1) a dog clutch engaging a first rotating member disposed in the power transmission path and a second rotating member connected to the drive power source or the sub-drive wheels in a power transmittable manner, (f-2) a synchronization mechanism synchronizing a rotation speed of the first rotating member with a rotation speed of the second rotating member, and (f-3) an electromagnetic actuator having an electromagnetic coil to generate a torque for causing the synchronization mechanism to increase the rotation speed of the first rotating member and to cause the dog clutch to engage when the electromagnetic coil is subjected to energization control. For example, this corresponds to a four-wheel drive vehicle with a disconnect function described in Patent Document 1. When the dog clutch of the first connecting/disconnecting device is engaged, the electromagnetic coil of the electromagnetic actuator is subjected to the energization control to generate the torque for causing the synchronization mechanism to increase the rotation speed of the first rotating member, so that the rotation speed of the first rotating member is synchronized with the rotation speed of the second rotating member.

PRIOR ART DOCUMENT

Patent Document

Patent Document 1: Japanese Laid-Open Patent Publication No. 2017-114460

SUMMARY OF THE INVENTION

Technical Problem

In the four-wheel drive vehicle as described in patent document 1, the electromagnetic coil is subjected to energization control based on a predefined current command value, and if a change occurs in an increasing characteristic of the rotation speed of the first rotating member with respect to the current command value due to, for example, a change in rotation resistance of the first rotating member caused by aging etc., increase rate of the rotation speed of the first rotating member deviates from a speed corresponding to the predefined current command value, which causes a problem such as a larger sound emitted from the dog clutch when the dog clutch is engaged or a longer time required until the dog clutch is engaged.

The present invention was conceived in view of the situations and it is therefore an object of the present invention to provide a four-wheel drive vehicle in which a sound emitted from a dog clutch disposed in one connecting/disconnecting device of the first and second connecting/disconnecting devices is reduced when the dog clutch is engaged and a time required until the dog clutch is engaged is reduced.

Solution to Problem

To achieve the above object, a first aspect of the present invention provides a four-wheel drive vehicle comprising: (a) a main drive wheels to which a drive power from a drive power source is transmitted; sub-drive wheels to which a portion of the drive power from the drive power source is transmitted during four-wheel drive running; a power transmission path transmitting the drive power from the drive power source to the sub-drive wheels; a first connecting/disconnecting device selectively disconnecting or connecting between the power transmission path and the drive power source; and a second connecting/disconnecting device selectively disconnecting or connecting between the power transmission path and the sub-drive wheels, at least one connecting/disconnecting device of the first and second connecting/disconnecting devices including: a dog clutch engaging a first rotating member disposed in the power transmission path and a second rotating member connected to the drive power source or the sub-drive wheels in a power transmittable manner; a synchronization mechanism synchronizing a rotation speed of the first rotating member with a rotation speed of the second rotating member; and an electromagnetic actuator including an electromagnetic coil to generate a torque for causing the synchronization mechanism to increase the rotation speed of the first rotating member and to cause the dog clutch to engage when the electromagnetic coil is subjected to energization control, wherein (b) the four-wheel drive vehicle includes a control device providing the energization control of the electromagnetic coil based on a preliminarily stored current command value to engage the dog clutch of the one connecting/disconnecting device, and wherein (c) the control device learns a characteristic value indicative of an increasing characteristic of the rotation speed of the first rotating member with respect to the current command value and updates the current command value such that an increase rate of the rotation speed of the first rotating member becomes equal to a predetermined rate based on the learned characteristic value.

Advantageous Effects of Invention

The four-wheel drive vehicle recited in the first aspect of the invention includes the control device providing the energization control of the electromagnetic coil based on the preliminarily stored current command value to engage the dog clutch of the one connecting/disconnecting device, and the control device learns the characteristic value indicative of the increasing characteristic of the rotation speed of the first rotating member with respect to the current command value and updates the current command value such that the increase rate of the rotation speed of the first rotating member becomes equal to the predetermined speed based on the learned characteristic value, so that when the dog clutch is engaged, the increase rate of the first rotating member can be maintained at the predetermined rate. Therefore, when the dog clutch is engaged, the sound emitted from the dog clutch can suitably be reduced, and time required until engaging the dog clutch can suitably be shortened.

DESCRIPTION OF EMBODIMENTS

Figure 1:
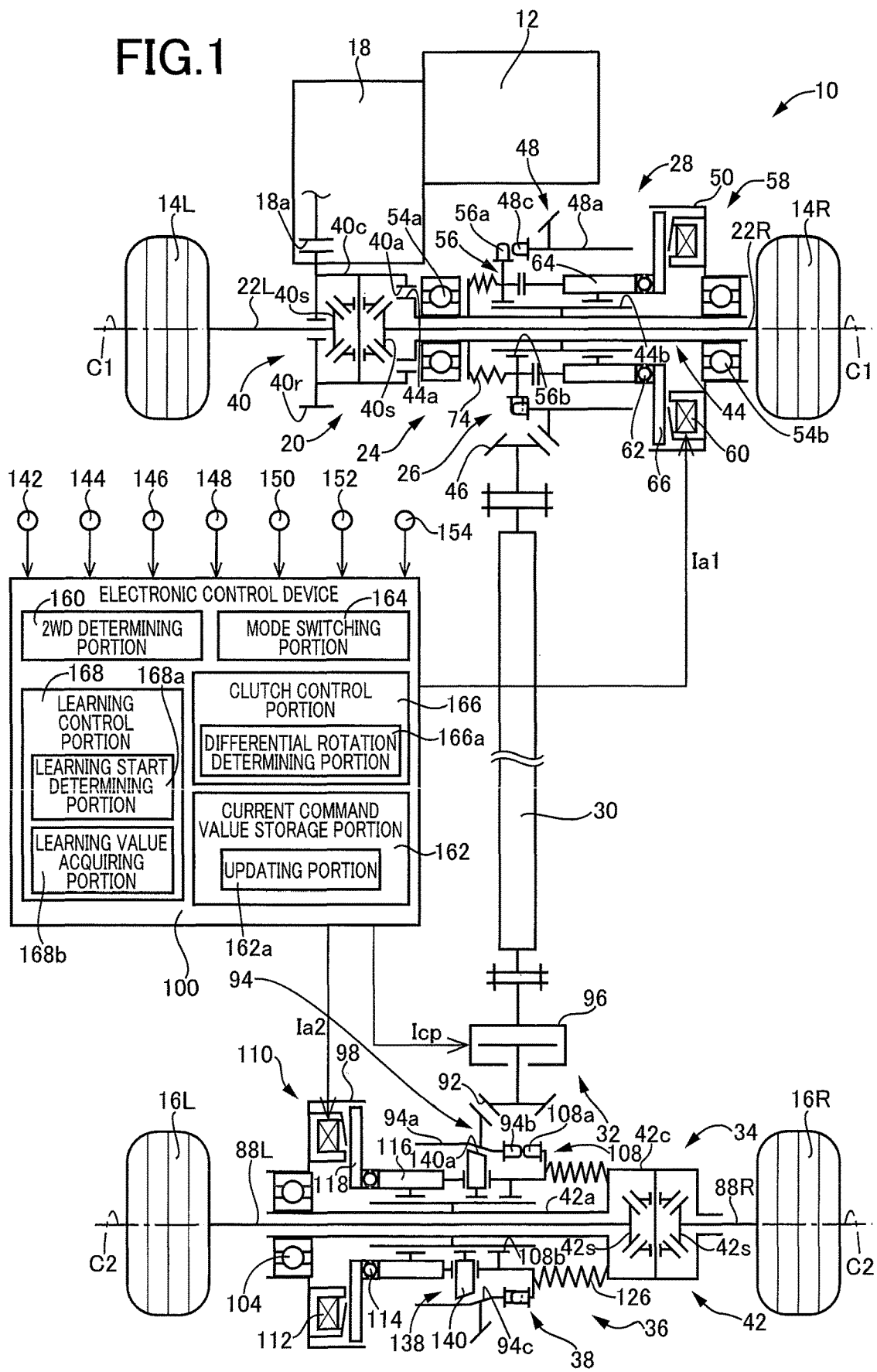
FIG. 1 is a schematic for schematically explaining a configuration of a four-wheel drive vehicle to which the present invention is preferably applied.

A second aspect of the present invention provides the four-wheel drive vehicle recited in the first aspect of the invention, wherein (a) the power transmission path includes a control coupling controlling a transmission torque transmitted from the drive power source to the sub-drive wheels during four-wheel drive running, and wherein (b) the control device learns the characteristic value while the power transmission path and the drive power source or the sub-drive wheels are disconnected by the other connecting/disconnecting device of the first and second connecting/disconnecting devices and the control coupling is released. Therefore, even if the dog clutch of the one connecting/disconnecting device is engaged so as to learn the characteristic value, only a part of the power transmission path is connected to the drive power source or the sub-drive wheels in a power transmittable manner, and therefore, for example, as compared to a four-wheel drive vehicle not including the control coupling in the power transmission path so that the power transmission path is entirely coupled to the drive power source or the sub-drive wheels in a power transmittable manner when the dog clutch of the one connecting/disconnecting device is engaged, the mass of the members increased in rotation by engaging the dog clutch of the one connecting/disconnecting device can suitably be reduced. This can appropriately suppress a drive power loss at the time of learning of the characteristic value and therefore can suitably increase the number of times of learning, i.e., a frequency of learning, of the characteristic value during vehicle running.

A third aspect of the present invention provides the four-wheel drive vehicle recited in the first or second aspect of the invention, wherein (a) the first rotating member is rotatably disposed in a casing housing the one connecting/disconnecting device to stir an oil stored in the casing, wherein (b) the control device stores a plurality of values corresponding to oil temperatures of the oil as the current command value, and wherein (c) the control device provides the energization control of the electromagnetic coil based on the current command value corresponding to the oil temperature of the oil to engage the dog clutch of the one connecting/disconnecting device and updates the current command value corresponding to the oil temperature of the oil at the time of learning of the characteristic value. Therefore, even if the rotation resistance of the first rotating member is changed due to a change in the oil temperature of the oil, the increase rate of the rotation speed of the first rotating member can suitably be maintained at the predetermined speed.

A fourth aspect of the present invention provides the four-wheel drive vehicle recited in the third aspect of the invention, wherein the control device updates each of the plurality of the current command values corresponding to the oil temperatures of the oil based on the learned characteristic value. Therefore, the electronic control device can update not only one current command value corresponding to the oil temperature of the oil at the time of learning of the characteristic value but also the plurality of the current command values corresponding to a plurality of the oil temperatures of the oil other than the oil temperature of the oil. As a result, even if the oil temperature of the oil changes during vehicle running, the increase rate of the rotation speed of the first rotating member can suitably be maintained at the predetermined speed.

A fifth aspect of the present invention provides the four-wheel drive vehicle recited in any one of the first to fourth aspects of the invention, wherein the characteristic value is the increase rate of the rotation speed of the first rotating member increased at the time of engagement of the dog clutch of the one connecting/disconnecting device from when the energization control is started until when a predetermined time period has elapsed. Therefore, when the dog clutch of the one connecting/disconnecting device is engaged, the characteristic value can suitably be learned.

A sixth aspect of the present invention provides the four-wheel drive vehicle recited in any one of the first to fourth aspects of the invention, wherein the characteristic value is an elapsed time at the time of engagement of the dog clutch of the one connecting/disconnecting device from when the energization control is started until when the rotation speed of the first rotating member increases to a predetermined speed set in advance. Therefore, when the dog clutch of the one connecting/disconnecting device is engaged, the elapsed time can suitably be learned.

Examples of the present invention will now be described in detail with reference to the drawings. In the following examples, the figures are simplified or deformed as needed and portions are not necessarily precisely drawn in terms of dimension ratio, shape, etc.

First Example

FIG. 1 is a schematic for schematically explaining a configuration of a four-wheel drive vehicle 10 to which the present invention is preferably applied. In FIG. 1, the four-wheel drive vehicle 10 has an FF-based four-wheel drive device. The four-wheel drive device includes a first power transmission path transmitting a drive power from an engine (drive power source) 12 to a left-and-right pair of front wheels (main drive wheels) 14L, 14R, and a second power transmission path transmitting a portion of the drive power of the engine 12 to a left-and-right pair of rear wheels (sub-drive wheels) 16L, 16R in a four-wheel drive state.

When the four-wheel drive vehicle 10 is in a two-wheel drive state, the drive power transmitted from the engine 12 through an automatic transmission 18 is transmitted through a front-wheel drive power distributing device 20 and a left-and-right pair of front wheel axles 22L, 22R to the front wheels 14L, 14R. In the two-wheel drive state, at least a first dog clutch (dog clutch) 26 disposed in a first connecting/disconnecting device (connecting/disconnecting device) 24 is released, and the drive power is not transmitted from the engine 12 to a power transmission path 32, a rear-wheel drive power distributing device 34, and the rear wheels 16L, 16R. However, when the four-wheel drive vehicle 10 is in the four-wheel drive state, the first dog clutch 26 and a second dog clutch (dog clutch) 38 disposed in a second connecting/disconnecting device (connecting/disconnecting device) 36 are both engaged, and the drive power is transmitted from the engine 12 to a transfer 28, the power transmission path 32, the rear-wheel drive power distributing device 34, and the rear wheels 16L, 16R. The front-wheel drive power distributing device 20 distributes the drive power transmitted from the engine 12 via a first differential device 40 to the front wheels 14L, 14R when the four-wheel drive vehicle 10 is in the two-wheel drive state or the four-wheel drive state. The rear-wheel drive power distributing device 34 distributes the drive power transmitted from the engine 12 via a second differential device 42 to the rear wheels 16L, 16R when the four-wheel drive vehicle 10 is in the four-wheel drive state. The power transmission path 32 includes the transfer 28 and a propeller shaft 30, for example.

As shown in FIG. 1, the front-wheel drive power distributing device 20 includes the first differential device 40 disposed rotatably around a first rotation axis C1. For example, the first differential device 40 includes a ring gear 40r meshed with an output gear 18a of the automatic transmission 18, a differential casing 40c integrally fixed to the ring gear 40r and having a pair of side gears 40s assembled therein, etc. When the drive power is transmitted from the engine 12 to the ring gear 40r, the first differential device 40 configured as described above transmits the drive power to the front wheels 14L, 14R while allowing a differential rotation of the left and right front wheel axles 22L, 22R. The differential casing 40c is provided with inner circumferential meshing teeth 40a fitted to first outer circumferential spline teeth 44a formed on an axial end portion on the front wheel 14L side of an input shaft 44 disposed in the transfer 28. As a result, a portion of the drive power transmitted from the engine 12 to the differential casing 40c is input to the transfer 28 via the input shaft 44.

Figure 2:
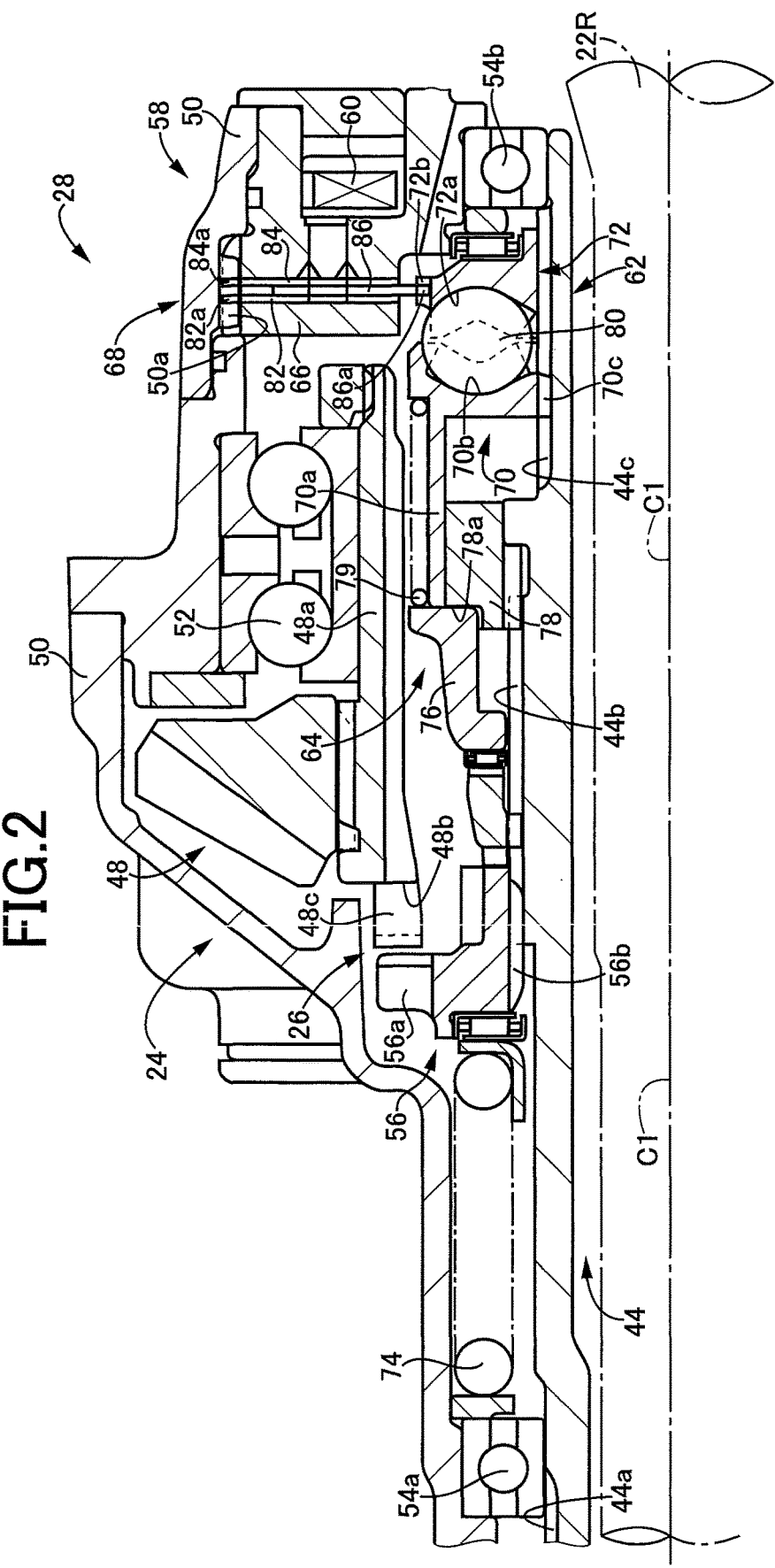
FIG. 2 is a cross-sectional view for explaining a configuration of a first connecting/disconnecting device disposed on the four-wheel drive vehicle of FIG. 1.

As shown in FIGS. 1 and 2, the transfer 28 includes the cylindrical input shaft 44, a cylindrical first ring gear 48, and the first connecting/disconnecting device 24. The input shaft 44 is connected to the engine 12 in a power transmittable manner. The first ring gear 48 is meshed with a driven pinion 46 (see FIG. 1) coupled to an end portion of the propeller shaft 30 on the side of the front wheels 14L, 14R. The first connecting/disconnecting device 24 selectively disconnects or connects a power transmission path between the input shaft 44 and the first ring gear 48, i.e., a power transmission path between the engine 12 and the power transmission path 32. When the first connecting/disconnecting device 24 connects the power transmission path between the input shaft 44 and the first ring gear 48, the transfer 28 outputs to the propeller shaft 30 a portion of the drive power transmitted from the engine 12 to the differential casing 40c.

As shown in FIG. 2, the cylindrical first ring gear 48 is a bevel gear having helical teeth or a hypoid gear formed thereon, for example. The first ring gear 48 is provided with a shaft portion 48a projected in a substantially cylindrical shape from an inner circumferential portion of the first ring gear 48 toward the front wheel 14R. For example, the cylindrical first ring gear 48 has the shaft portion 48a supported by a first casing 50 via a bearing 52 disposed in the first casing (casing) 50 housing the first connecting/disconnecting device 24 etc. and is thereby supported rotatably around the first rotation axis C1 in a cantilevered manner. Although not shown, oil is stored in the first casing 50, and when the first ring gear 48 rotates around the first rotation axis C1, the oil stored in the first casing 50 is stirred.

As shown in FIG. 2, the cylindrical input shaft 44 penetrates through the cylindrical first ring gear 48, and a portion of the input shaft 44 is disposed inside the first ring gear 48. The cylindrical input shaft 44 has both end portions supported by the first casing 50 via a pair of bearings 54a, 54b disposed in the first casing 50, so that the input shaft 44 is supported pivotally around the first rotation axis C1. In other words, the input shaft 44 is rotatably supported concentrically with the first ring gear 48. The cylindrical input shaft 44 is provided with the first outer circumferential spline teeth 44a formed on an outer circumferential surface of the axial end portion of the input shaft 44 on the front wheel 14L side, second outer circumferential spline teeth 44b formed on an outer circumferential surface of a central portion of the input shaft 44, and third outer circumferential spline teeth 44c formed on an outer circumferential surface of the end portion of the input shaft 44 on the front wheel 14R side.

As shown in FIG. 2, the first dog clutch 26 includes a plurality of first meshing teeth 48c and a cylindrical first movable sleeve 56. The first meshing teeth 48c are formed on a side surface 48b of the shaft portion 48a of the first ring gear 48 on the front wheel 14L side. The first movable sleeve 56 is provided with a plurality of first meshing teeth 56a that can mesh with the first meshing teeth 48c. In the first dog clutch 26, when the first movable sleeve 56 is moved in a first rotation axis C1 direction by a first electromagnetic actuator (electromagnetic actuator) 58 described later, the first meshing teeth 56a of the first movable sleeve 56 are meshed with the first meshing teeth 48c formed on the first ring gear 48 to engage the first ring gear 48 and the first movable sleeve 56. The first movable sleeve 56 is provided with inner circumferential meshing teeth 56b meshed with second outer circumferential spline teeth 44b formed on the input shaft 44 relatively non-rotatably around the first rotation axis C1 with respect to the input shaft 44 and relatively movably in the first rotation axis C1 direction with respect to the input shaft 44. Therefore, the first movable sleeve 56 is connected in a power transmittable manner to the engine 12 via the input shaft 44, for example.

As shown in FIG. 2, the first electromagnetic actuator 58 selectively moves the first movable sleeve 56 in the first rotation axis C1 direction to a first meshing position and a first non-meshing position to engage the first dog clutch 26. The first meshing position is a position at which the first meshing teeth 56a of the first movable sleeve 56 are meshed with the first meshing teeth 48c of the first ring gear 48. At the first meshing position, the first ring gear 48 and the first movable sleeve 56 cannot relatively rotate, and the first dog clutch 26 is engaged. The first non-meshing position is a position at which the first meshing teeth 56a of the first movable sleeve 56 are not meshed with the first meshing teeth 48c of the first ring gear 48. At the first non-meshing position, the first ring gear 48 and the first movable sleeve 56 can relatively rotate, and the first dog clutch 26 is released.

As shown in FIG. 2, the first electromagnetic actuator 58 includes a first electromagnetic coil 60, a first ball cam 62, and a first ratchet mechanism 64. In the first ball cam 62, when a first movable piece 66 is attracted by the first electromagnetic coil 60 and a rotation braking torque is generated in an annular second cam member 72 via a first auxiliary clutch 68 while the input shaft 44 is rotating, i.e., during vehicle running, the annular second cam member 72 and an annular first cam member 70 are relatively rotated to move the first cam member 70 in the first rotation axis C1 direction. When the first cam member 70 is moved in the first rotation axis C1 direction by the first ball cam 62, the first ratchet mechanism 64 retains a movement position of the first movable sleeve 56 moved in the first rotation axis C1 direction due to the movement of the first cam member 70. The first ratchet mechanism 64 includes a first spring 74 constantly urging the first movable sleeve 56 from the first non-meshing position toward the first meshing position, i.e., constantly urging the first movable sleeve 56 toward the front wheel 14R in the first rotation axis C1 direction.

As shown in FIG. 2, the first ratchet mechanism 64 includes an annular first piston 70a, an annular second piston 76, and an annular holder 78. The first piston 70a is reciprocated in the first rotation axis C1 direction with a predetermined stroke by the first ball cam 62 due to the first electromagnetic coil 60 attracting the first movable piece 66 and not attracting the first movable piece 66. The second piston 76 is disposed relatively rotatably with respect to the input shaft 44. The second piston 76 is moved in the first rotation axis C1 direction against the urging force of the first spring 74 by the first piston 70a moving in the first rotation axis C1 direction. The holder 78 is disposed relatively non-rotatably around the first rotation axis C1 with respect to the input shaft 44 and immovably in the first rotation axis C1 direction with respect to the input shaft 44. The holder 78 has latching teeth 78a latching the second piston 76 moved by the first piston 70a. As shown in FIG. 2, the first cam member 70 of the first ball cam 62 is integrally provided with the first piston 70a of the first ratchet mechanism 64. The first ratchet mechanism 64 includes a coil spring 79 disposed in a compressed state between the second piston 76 and the first cam member 70. The coil spring 79 constantly urges the first cam member 70 in a direction toward the second cam member 72.

As shown in FIG. 2, the first ball cam 62 includes an annular pair of the first cam member 70 and the second cam member 72, and a plurality of spherical rolling elements 80. The first cam member 70 and the second cam member 72 are inserted in an overlapping manner in the first rotation axis C1 direction between the second piston 76 of the first ratchet mechanism 64 and the bearing 54b. The spherical rolling elements 80 are sandwiched between a cam surface 70b formed on the first cam member 70 and a cam surface 72a formed on the second cam member 72. When the first cam member 70 and the second cam member 72 are relatively rotated in the first ball cam 62 configured as described above, the first cam member 70 is separated from the second cam member 72 in the first rotation axis C1 direction. The first cam member 70 is provided with inner circumferential teeth 70c meshed with the third outer circumferential spline teeth 44c.

The inner circumferential teeth 70c make the first cam member 70 relatively non-rotatable around the first rotation axis C1 with respect to the input shaft 44 and relatively movable in the first rotation axis C1 direction with respect to the input shaft 44.

As shown in FIG. 2, the first auxiliary clutch 68 includes the first movable piece 66 described above, a pair of disk-shaped first friction plates 82, 84 disposed between the first movable piece 66 and the first electromagnetic coil 60, and a disk-shaped second friction plate 86 disposed between the pair of first friction plates 82, 84. Outer circumferential portions of the pair of first friction plates 82, 84 are provided with outer circumferential teeth 82a, 84a, respectively, meshed with inner circumferential spline teeth 50a formed on the first casing 50. The outer circumferential teeth 82a, 84a make the first friction plates 82, 84 relatively non-rotatable around the first rotation axis C1 with respect to the first casing 50 and relatively movable in the first rotation axis C1 direction with respect to the first casing 50. An inner circumferential portion of the second friction plate 86 is provided with inner circumferential teeth 86a meshed with outer circumferential spline teeth 72b formed on an outer circumferential portion of the second cam member 72. The inner circumferential teeth 86a make the second friction plate 86 relatively non-rotatable around the first rotation axis C1 with respect to the second cam member 72 and relatively movable in the first rotation axis C1 direction with respect to the second cam member 72.

In the first electromagnetic actuator 58 configured as described above, for example, when an ACT1 command current Ia1 (A) is supplied to the first electromagnetic coil 60 from an electronic control device (control device) 100 (see FIG. 1) described later and the first movable piece 66 is attracted by the first electromagnetic coil 60 while the input shaft 44 is rotating i.e. during vehicle running, the first friction plates 82, 84 and the second friction plate 86 of the first auxiliary clutch 68 are clamped due to the first movable piece 66 between the first movable piece 66 and the first electromagnetic coil 60, so that a rotation braking torque is transmitted to the second friction plate 86, i.e., to the second cam member 72. Therefore, the first cam member 70 and the second cam member 72 are relatively rotated by the rotation braking torque, and the first piston 70a formed integrally with the first cam member 70 moves toward the front wheel 14L against the urging forces of the first spring 74 and the coil spring 79 in the first rotation axis C1 direction with respect to the second cam member 72 via the spherical rolling elements 80. When the ACT1 command current Ia1 (A) is no longer supplied from the electronic control device 100 to the first electromagnetic coil 60, i.e., when the first movable piece 66 is no longer attracted by the first electromagnetic coil 60, the rotation braking torque is not transmitted to the second cam member 72, and therefore, the second cam member 72 is rotated together with the first cam member 70 via the spherical rolling elements 80 so that the first piston 70a is moved toward the front wheel 14R by the urging forces of the first spring 74 and the coil spring 79.

When the first piston 70a is reciprocated once in the first rotation axis C1 direction toward the front wheel 14L and the front wheel 14R by the first electromagnetic actuator 58 in the first connecting/disconnecting device 24, as shown in FIG. 2, the first movable sleeve 56 is moved via the first ratchet mechanism 64 to the first non-meshing position against the urging force of the first spring 74. For example, when the first piston 70a is reciprocated twice by the first electromagnetic actuator 58, i.e., when the first piston 70a is further reciprocated once while the first movable sleeve 56 is at the first non-meshing position in the first connecting/disconnecting device 24, the second piston 76 is unlatched from the latching teeth 78a of the holder 78 and the first movable sleeve 56 is moved to the first meshing position by the urging force of the first spring 74 although not shown.

Figure 3:
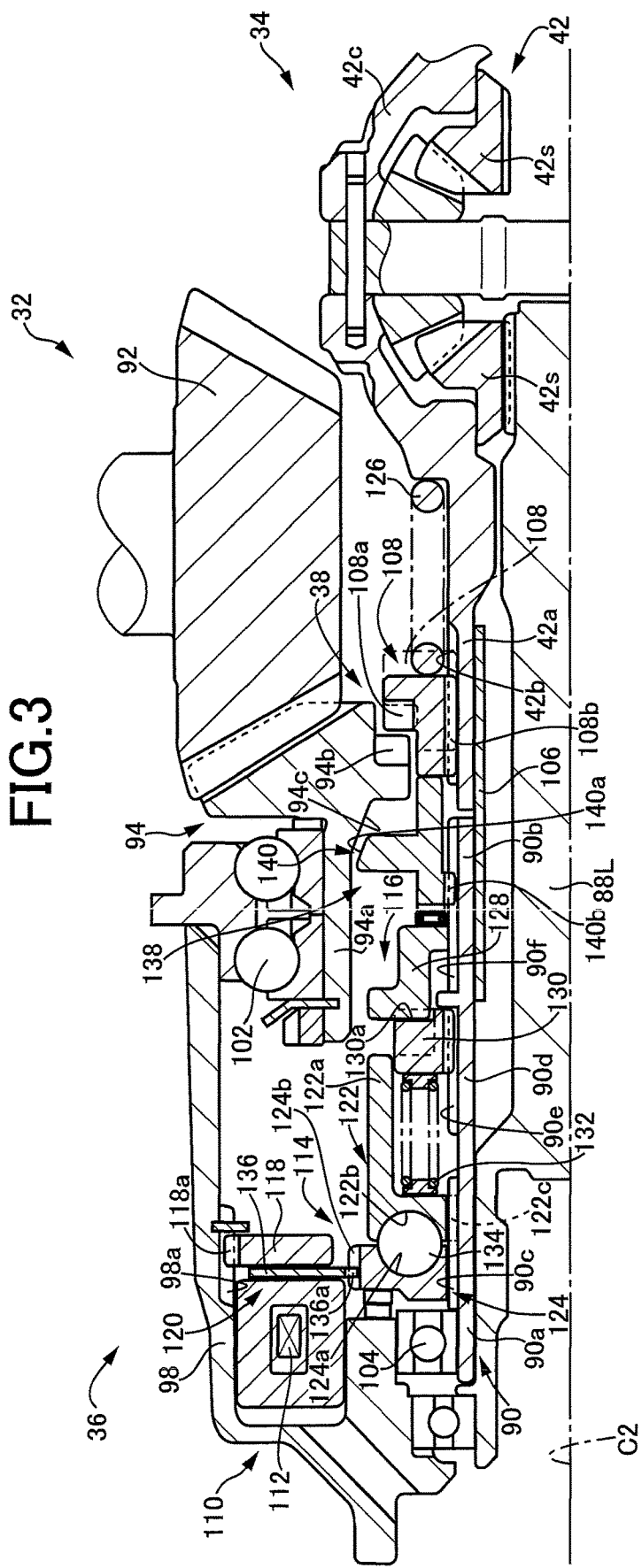
FIG. 3 is a cross-sectional view for explaining a configuration of a second connecting/disconnecting device disposed on the four-wheel drive vehicle of FIG. 1.

As shown in FIG. 1, the rear-wheel drive power distributing device 34 includes the second differential device 42 disposed rotatably around a second rotation axis C2. For example, the second differential device 42 includes a differential casing 42c having a pair of side gears 42s assembled therein, etc. When the drive power from the engine 12 is transmitted to the differential casing 42c, the second differential device 42 configured as described above transmits the drive power to the rear wheels 16L, 16R while allowing a differential rotation of a left-and-right pair of rear wheel axles 88L, 88R. As shown in FIG. 3, the differential casing 42c is provided with a cylinder portion 42a projected in a cylindrical shape from the differential casing 42c toward the rear wheel 16L side to cover an outer circumference of a portion of the rear wheel axle 88L.

As shown in FIG. 3, the rear-wheel drive power distributing device 34 includes a cylindrical cylinder member (second rotating member) 90, a second ring gear (first rotating member) 94, and the second connecting/disconnecting device 36. The cylinder member 90 is connected to the differential casing 42c of the second differential device 42 in a power transmittable manner. The second ring gear 94 is meshed with a drive pinion 92 coupled to an end portion of the propeller shaft 30 on the side of the rear wheels 16L, 16R. The second connecting/disconnecting device 36 selectively disconnects or connects a power transmission path between the cylinder member 90 and the second ring gear 94, i.e., a power transmission path between the rear wheels 16L, 16R and the power transmission path 32. When the second connecting/disconnecting device 36 connects the power transmission path between the cylinder member 90 and the second ring gear 94, the rear-wheel drive power distributing device 34 outputs a portion of the drive power transmitted from the engine 12, to the left and right rear wheels 16L, 16R via the propeller shaft 30, i.e., the power transmission path 32, if the first dog clutch 26 is engaged. As shown in FIG. 1, the power transmission path 32 includes, for example, the first ring gear 48, the driven pinion 46, the propeller shaft 30, the drive pinion 92, and the second ring gear 94. A portion of the drive power from the engine 12 is transmitted through the power transmission path 32 to the rear wheels 16L, 16R when the first dog clutch 26 and the second dog clutch 38 are respectively engaged. The power transmission path 32 includes a control coupling 96 controlling a transmission torque transmitted from the engine 12 to the rear wheels 16L, 16R during four-wheel drive running, i.e., when the first dog clutch 26 and the second dog clutch 38 are respectively engaged.

As shown in FIG. 3, the cylindrical second ring gear 94 is a bevel gear having helical teeth or a hypoid gear formed thereon, for example. The second ring gear 94 is provided with a shaft portion 94a projected in a substantially cylindrical shape from an inner circumferential portion of the second ring gear 94 toward the rear wheel 16L. For example, the second ring gear 94 has the shaft portion 94a supported by a second casing 98 via a bearing 102 disposed in the second casing (casing) 98 housing the second connecting/disconnecting device 36 etc. and is thereby supported rotatably around the second rotation axis C2 in a cantilevered manner. Although not shown, oil is stored in the second casing 98, and when the second ring gear 94 rotates around the second rotation axis C2, the oil stored in the second casing 98 is stirred.

As shown in FIG. 3, the cylindrical cylinder member 90 has an end portion 90a on the rear wheel 16L side supported by the second casing 98 via a bearing 104 and an end portion 90b on the rear wheel 16R side of the cylinder member 90 supported by a tubular coupling member 106 fitted to inside of the cylinder portion 42a of the differential casing 42c. As a result, the cylinder member 90 is supported rotatably around the second rotation axis C2, i.e., the cylinder member 90 is rotatably supported concentrically with the second ring gear 94. The tubular coupling member 106 is fitted into the inside of the end portion 90b of the cylinder member 90 and the inside of the cylinder portion 42a of the differential casing 42c such that the cylinder member 90 and the cylinder portion 42a of the differential casing 42c are relatively non-rotatable around the second rotation axis C2 and relatively immovable in a second rotation axis C2 direction. As a result, the cylinder member 90 rotates around the second rotation axis C2 during vehicle running. The cylindrical cylinder member 90 is provided with first outer circumferential spline teeth 90c formed on an outer circumferential surface of the end portion 90a of the cylinder member 90 on the rear wheel 16L side, second outer circumferential spline teeth 90e formed on an outer circumferential surface of a central portion 90d of the cylinder member 90, and third outer circumferential spline teeth 90f formed on an outer circumferential surface of the end portion 90b of the cylinder member 90 on the rear wheel 16R side.

As shown in FIG. 3, the second dog clutch 38 includes a plurality of second meshing teeth 94b and a cylindrical second movable sleeve 108. The second meshing teeth 94b are formed on the second ring gear 94. The second movable sleeve 108 is provided with a plurality of second meshing teeth 108a that can mesh with the second meshing teeth 94b. In the second dog clutch 38, when the second movable sleeve 108 is moved in the second rotation axis C2 direction by a second electromagnetic actuator (electromagnetic actuator) 110 described later, the second meshing teeth 108a of the second movable sleeve 108 are meshed with the second meshing teeth 94b formed on the second ring gear 94 to engage the second ring gear 94 and the second movable sleeve 108. The second movable sleeve 108 is provided with inner circumferential meshing teeth 108b meshed with outer circumferential spline teeth 42b formed on the cylinder portion 42a of the differential casing 42c. The inner circumferential meshing teeth 108b make the second movable sleeve 108 relatively non-rotatable around the second rotation axis C2 with respect to the cylinder member 90, i.e., the cylinder portion 42a of the differential casing 42c, and relatively movable in the second rotation axis C2 direction with respect to the cylinder portion 42a of the differential casing 42c. Therefore, the second movable sleeve 108 is connected to the rear wheels 16L, 16R in a power transmittable manner via the second differential device 42, for example.

As shown in FIG. 3, the second electromagnetic actuator 110 selectively moves the second movable sleeve 108 in the second rotation axis C2 direction to a second meshing position and a second non-meshing position to engage the second dog clutch 38. The second meshing position is a position at which the second meshing teeth 108a of the second movable sleeve 108 are meshed with the second meshing teeth 94b of the second ring gear 94. At the second meshing position, the second ring gear 94 and the second movable sleeve 108 cannot relatively rotate, and the second dog clutch 38 is engaged. The second non-meshing position is a position at which the second meshing teeth 108a of the second movable sleeve 108 are not meshed with the second meshing teeth 94b of the second ring gear 94. At the second non-meshing position, the second ring gear 94 and the second movable sleeve 108 can relatively rotate, and the second dog clutch 38 is released.

As shown in FIG. 3, the second electromagnetic actuator 110 includes a second electromagnetic coil (electromagnetic coil) 112, a second ball cam 114, and a second ratchet mechanism 116. In the second ball cam 114, when a second movable piece 118 is attracted by the second electromagnetic coil 112 and a rotation braking torque is generated in an annular second cam member 124 via a second auxiliary clutch 120 while the cylinder member 90 is rotating, i.e., during vehicle running, the annular second cam member 124 and an annular first cam member 122 are relatively rotated to move the first cam member 122 in the second rotation axis C2 direction. When the first cam member 122 is moved in the second rotation axis C2 direction by the second ball cam 114, the second ratchet mechanism 116 retains a movement position of the second movable sleeve 108 moved in the second rotation axis C2 direction due to the movement of the first cam member 122. The second ratchet mechanism 116 includes a second spring 126 constantly urging the second movable sleeve 108 from the second non-meshing position toward the second meshing position, i.e., constantly urging the second movable sleeve 108 toward the rear wheel 16L in the second rotation axis C2 direction.

As shown in FIG. 3, the second ratchet mechanism 116 includes an annular first piston 122a, an annular second piston 128, and an annular holder 130. The first piston 122a is reciprocated in the second rotation axis C2 direction with a predetermined stroke by the second ball cam 114 due to the second electromagnetic coil 112 attracting the second movable piece 118 and not attracting the second movable piece 118. The second piston 128 is disposed relatively rotatably with respect to the cylinder member 90. The second piston 128 is moved in the second rotation axis C2 direction against the urging force of the second spring 126 by the first piston 122a moving in the second rotation axis C2 direction. The holder 130 is disposed relatively non-rotatably with respect to the cylinder member 90 and immovably in the second rotation axis C2 direction with respect to the cylinder member 90. The holder 130 has latching teeth 130a latching the second piston 128 moved by the first piston 122a. As shown in FIG. 3, the first cam member 122 of the second ball cam 114 is integrally provided with the first piston 122a of the second ratchet mechanism 116. The second ratchet mechanism 116 includes a coil spring 132 disposed in a compressed state between the holder 130 and the first cam member 122. The coil spring 132 constantly urges the first cam member 122 in a direction toward the second cam member 124.

As shown in FIG. 3, the second ball cam 114 includes an annular pair of the first cam member 122 and the second cam member 124, and a plurality of spherical rolling elements 134. The first cam member 122 and the second cam member 124 are inserted in an overlapping manner in the second rotation axis C2 direction between the second piston 128 of the second ratchet mechanism 116 and the bearing 104. The spherical rolling elements 134 are sandwiched between a cam surface 122b formed on the first cam member 122 and a cam surface 124a formed on the second cam member 124. When the first cam member 122 and the second cam member 124 are relatively rotated in the second ball cam 114 configured as described above, the first cam member 122 is separated from the second cam member 124 in the second rotation axis C2 direction. The first cam member 122 is provided with inner circumferential teeth 122c meshed with the first outer circumferential spline teeth 90c formed on the cylinder member 90. The inner circumferential teeth 122c make the first cam member 122 relatively non-rotatable around the second rotation axis C2 with respect to the cylinder member 90 and relatively movable in the second rotation axis C2 direction with respect to the cylinder member 90.

As shown in FIG. 3, the second auxiliary clutch 120 includes the second movable piece 118 described above, and a disk-shaped friction plate 136 disposed between the second movable piece 118 and the second electromagnetic coil 112. An outer circumferential portion of the second movable piece 118 is provided with outer circumferential teeth 118a engaged with inner circumferential spline teeth 98a formed on the second casing 98. The outer circumferential teeth 118a make the second movable piece 118 non-rotatable around the second rotation axis C2 with respect to the second casing 98 and movable in the second rotation axis C2 direction with respect to the second casing 98. An inner circumferential portion of the friction plate 136 is provided with inner circumferential teeth 136a engaged with outer circumferential spline teeth 124b formed on an outer circumferential portion of the second cam member 124. The inner circumferential teeth 136a make the friction plate 136 relatively non-rotatable around the second rotation axis C2 with respect to the second cam member 124 and movable in the second rotation axis C2 direction with respect to the second cam member 124.

In the second electromagnetic actuator 110 configured as described above, for example, when an ACT2 command current Ia2 (A) is supplied to the second electromagnetic coil 112 from the electronic control device 100 and the second movable piece 118 is attracted by the second electromagnetic coil 112 while the cylinder member 90 is rotating i.e. during vehicle running, the friction plate 136 of the second auxiliary clutch 120 is clamped due to the second movable piece 118 between the second movable piece 118 and the second electromagnetic coil 112, so that a rotation braking torque is transmitted to the friction plate 136, i.e., to the second cam member 124. Therefore, the first cam member 122 and the second cam member 124 are relatively rotated by the rotation braking torque, and the first piston 122a formed integrally with the first cam member 122 moves toward the rear wheel 16R against the urging forces of the second spring 126 and the coil spring 132 in the second rotation axis C2 direction with respect to the second cam member 124 via the spherical rolling elements 134. When the ACT2 command current Ia2 (A) is no longer supplied from the electronic control device 100 to the second electromagnetic coil 112, i.e., when the second movable piece 118 is no longer attracted by the second electromagnetic coil 112, the rotation braking torque is not transmitted to the second cam member 124, and therefore, the second cam member 124 is rotated together with the first cam member 122 via the spherical rolling elements 134 so that the first piston 122a is moved toward the rear wheel 16L by the urging forces of the second spring 126 and the coil spring 132.

When the first piston 122a is reciprocated once in the second rotation axis C2 direction toward the rear wheel 16R and the rear wheel 16L by the second electromagnetic actuator 110 in the second connecting/disconnecting device 36, as shown in FIG. 3, the second movable sleeve 108 is moved via the second ratchet mechanism 116 to the second non-meshing position against the urging force of the second spring 126. For example, when the first piston 122a is reciprocated twice by the second electromagnetic actuator 110, i.e., when the first piston 122a is further reciprocated once while the second movable sleeve 108 is at the second non-meshing position in the second connecting/disconnecting device 36, the second piston 128 is unlatched from the latching teeth 130a of the holder 130 and the second movable sleeve 108 is moved to the second meshing position by the urging force of the second spring 126 although not shown.

As shown in FIG. 3, the second connecting/disconnecting device 36 includes a synchronization mechanism 138 synchronizing a rotation speed N2 (rpm) of the second ring gear 94 disposed in the power transmission path 32 with a rotation speed Nk2 (rpm) of the cylinder member 90 connected to the rear wheels 16L, 16R in a power transmittable manner when the second dog clutch 38 is engaged, i.e., when the second movable sleeve 108 is moved from the second non-meshing position to the second meshing position.

As shown in FIG. 3, the synchronization mechanism 138 includes a friction engagement member 140, a tapered first friction engagement surface 140a, and a tapered second friction engagement surface 94c. The friction engagement member 140 is disposed between the second piston 128 of the second ratchet mechanism 116 and the second movable sleeve 108. The first friction engagement surface 140a is formed on an outer circumferential portion of the friction engagement member 140. The second friction engagement surface 94c is formed on an inner circumferential portion of the second ring gear 94 in a manner allowing sliding contact with the first friction engagement surface 140a. An inner circumferential portion of the friction engagement member 140 is provided with inner circumferential teeth 140b meshed with the third outer circumferential spline teeth 90f formed on the cylinder member 90. The inner circumferential teeth 140b make the friction engagement member 140 relatively non-rotatable around the second rotation axis C2 with respect to the cylinder member 90 and movable in the second rotation axis C2 direction with respect to the cylinder member 90. Furthermore, the friction engagement member 140 is sandwiched between the second movable sleeve 108 and the second piston 128 by the urging force of the second spring 126. Therefore, the friction engagement member 140 is integrally fixed to the second movable sleeve 108 by the urging force of the second spring 126.

In the synchronization mechanism 138 configured as described above, when the ACT2 command current Ia2 (A) is supplied to the second electromagnetic coil 112 from the electronic control device 100 and the second movable sleeve 108 is moved against the urging force of the second spring 126 beyond the second non-meshing position toward the rear wheel 16R while the second movable sleeve 108 is at the second non-meshing position as shown in FIG. 3 and the cylinder member 90 is rotating around the second rotation axis C2, the first friction engagement surface 140a of the friction engagement member 140 is frictionally engaged with the second friction engagement surface 94c of the second ring gear 94. As a result, a torque rotating the cylinder member 90, i.e., a torque rotating the rear wheels 16L, 16R, is transmitted to the second ring gear 94, so that a torque is generated for causing the synchronization mechanism 138 to increase the rotation speed N2 of the second ring gear 94. Therefore, the rotation speed N2 of the second ring gear 94 is increased until reaching the rotation speed Nk2 of the cylinder member 90, i.e., until rotationally synchronizing with the rotation speed Nk2. When the ACT2 command current Ia2 (A) is no longer supplied from the electronic control device 100 to the second electromagnetic coil 112, the second movable sleeve 108 is moved toward the rear wheel 16L by the urging force of the second spring 126, and the second meshing teeth 108a of the second movable sleeve 108 are meshed with the second meshing teeth 94b of the second ring gear 94. The second movable sleeve 108 indicated by a dashed-dotted line in FIG. 3 is the second movable sleeve 108 when the second movable sleeve 108 is moved against the urging force of the second spring 126 beyond the second non-meshing position toward the rear wheel 16R.

In the four-wheel drive vehicle 10 configured as described above, when a two-wheel drive mode, i.e., a disconnect mode, is selected by the electronic control device 100, for example, the first dog clutch 26, the second dog clutch 38, and the control coupling 96 are respectively released to form the two-wheel drive state in which the drive power is transmitted from the engine 12 via the front-wheel drive power distributing device 20 to the front wheels 14L, 14R. In the four-wheel drive vehicle 10, when the two-wheel drive mode is selected by the electronic control device 100, the first dog clutch 26 and the second dog clutch 38 are switched from an engaged state to a released state, and the power transmission path 32, for example, the propeller shaft 30, is separated from the engine 12 and the rear wheels 16L, 16R. In the four-wheel drive vehicle 10 when a four-wheel drive mode, i.e., a connect mode, is selected by the electronic control device 100, the first dog clutch 26, the second dog clutch 38, and the control coupling 96 are respectively engaged to form the four-wheel drive state in which the drive power is transmitted from the engine 12 via the front-wheel drive power distributing device 20 to the front wheels 14L, 14R while the drive power is also transmitted from the engine 12 via the power transmission path 32 etc. to the rear wheels 16L, 16R. In the four-wheel drive vehicle 10, when the four-wheel drive mode is selected by the electronic control device 100, the second dog clutch 38 is switched from the released state to the engaged state, the control coupling 96 is engaged, and the first dog clutch 26 is switched from the released state to the engaged state.

The engaged state of the first dog clutch 26 described above is a state in which the first movable sleeve 56 is at the first meshing position and the first dog clutch 26 is engaged. The released state of the first dog clutch 26 described above is a state in which the first movable sleeve 56 is at the first non-meshing position and the first dog clutch 26 is released. The engaged state of the second dog clutch 38 described above is a state in which the second movable sleeve 108 is at the second meshing position and the second dog clutch 38 is engaged. The released state of the second dog clutch 38 described above is a state in which the second movable sleeve 108 is at the second non-meshing position and the second dog clutch 38 is released.

As shown in FIG. 1, the electronic control device 100 is configured to include a so-called microcomputer including a CPU, a RAM, a ROM, and an I/O interface, for example, and the CPU executes signal processes in accordance with a program stored in advance in the ROM, while utilizing a temporary storage function of the RAM, to provide various controls of the four-wheel drive vehicle 10. The electronic control device 100 is supplied with various input signals detected by sensors disposed on the four-wheel drive vehicle 10. For example, the signals input to the electronic control device 100 include: an ON/OFF signal indicative of whether the first dog clutch 26 is in the engaged state, i.e., an ON/OFF signal indicative of whether the first movable sleeve 56 is at the first meshing position, detected by a first position sensor 142; an ON/OFF signal indicative of whether the second dog clutch 38 is in the engaged state, i.e., an ON/OFF signal indicative of whether the second movable sleeve 108 is at the second meshing position, detected by a second position sensor 144; signals indicative of wheel speeds W (rpm), i.e., wheel speeds Wfl, Wfr, Wrl, Wrr (rpm) of the front wheels 14L, 14R and the rear wheels 16L, 16R, detected by a wheel speed sensor 146; signals indicative of a rotation speed N1 (rpm) of the first ring gear 48 and the rotation speed N2 (*rpm*) of the second ring gear 94 detected by a rotation speed sensor 148; signals indicative of an oil temperature T (° C.) of the oil stored in the first casing 50 and the second casing 98 detected by oil temperature sensors 150; a signal indicative of a vehicle speed V (km/h) detected by a vehicle speed sensor 152; and signals indicative of an acceleration Gfr (m/s$^2$) in a vehicle longitudinal direction and an acceleration Glr (m/s$^2$) in a vehicle width direction detected by an acceleration sensor 154.

Various output signals are supplied from the electronic control device 100 to devices disposed on the four-wheel drive vehicle 10. For example, the signals supplied from the electronic control device 100 to the portions include the ACT1 command current Ia1 (A) supplied to the first electromagnetic coil 60 of the first electromagnetic actuator 58 to switch the first dog clutch 26 to the engaged state or the released state, the ACT2 command current Ia2 (A) supplied to the second electromagnetic coil 112 of the second electromagnetic actuator 110 to switch the second dog clutch 38 to the engaged state or the released state, and a coupling drive current Icp (A) supplied to an actuator (not shown)

disposed in the control coupling 96 to control a transmission torque transmitted from the engine 12 to the rear wheels 16L, 16R during the four-wheel drive running.

As shown in FIG. 1, the electronic control device 100 includes, for example, a 2WD determining portion 160, a current command value storage portion 162, a mode switching portion 164, a clutch control portion 166, and a learning control portion 168.

The 2WD determining portion 160 determines whether the vehicle 10 is in the two-wheel drive state in which the drive power from the engine 12 is transmitted to the front wheels 14L, 14R. For example, when it is detected by the first position sensor 142 that the first movable sleeve 56 is not at the first meshing position, i.e., that the first movable sleeve 56 is at the first non-meshing position, and it is detected by the second position sensor 144 that the second movable sleeve 108 is not at the second meshing position, i.e., that the second movable sleeve 108 is at the second non-meshing position, the 2WD determining portion 160 determines that the vehicle 10 is in the two-wheel drive state.

Figure 4:
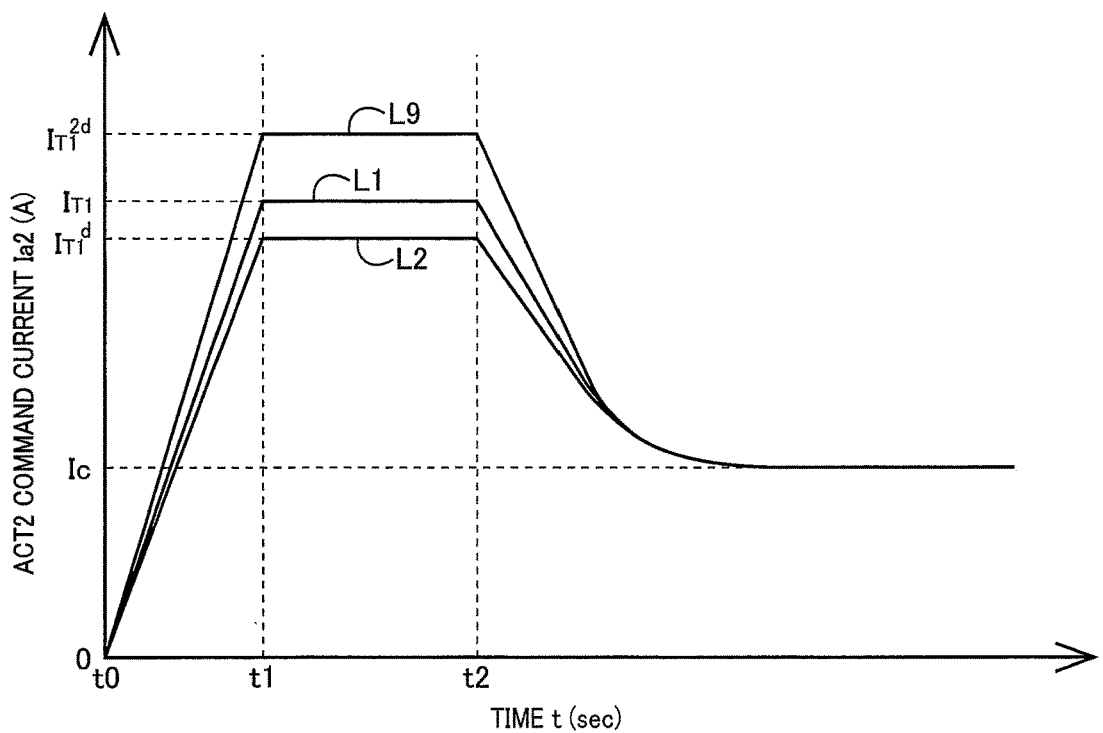
FIG. 4 is a diagram showing a current supplied to a second electromagnetic coil disposed in the second connecting/disconnecting device when a second dog clutch of the second connecting/disconnecting device of FIG. 3 is engaged.

The current command value storage portion 162 stores a plurality of current command values $I_T$ (A) corresponding to different oil temperatures T (° C.) of the oil stored in the first casing 50 and the second casing 98. Each of the current command values $I_T$ is a command value for providing an energization control of the second electromagnetic coil 112 of the second electromagnetic actuator 110, and the ACT2 command current Ia2 (A) is supplied to the second electromagnetic coil 112 based on the current command value $I_T$. For example, when the second electromagnetic coil 112 of the second electromagnetic actuator 110 is subjected to the energization control based on a current command value $I_{T1}$, as indicated by a solid line L1 of FIG. 4, the ACT2 command current Ia2 is increased to the current command value $I_{T1}$ from time t0 to time t1 set in advance, and the ACT2 command current Ia2 is maintained at the current command value $I_{T1}$ from time t1 to time t2 set in advance. At time t2, the ACT2 command current Ia2 is reduced to a predetermined current Ic set in advance, and the ACT2 command current Ia2 is maintained at the predetermined current Ic until the rotation speed N2 of the second ring gear 94 is synchronized with the rotation speed Nk2 of the second movable sleeve 108 in the synchronization mechanism 138. When the rotation speed N2 of the second ring gear 94 is synchronized with the rotation speed Nk2 of the second movable sleeve 108, the ACT2 command current Ia2 is made to be zero, and the second meshing teeth 108a are meshed with the second meshing teeth 94b. Therefore, in the second electromagnetic actuator 110, when the second electromagnetic coil 112 is subjected to the energization control in accordance with the current command value $I_T$, the ACT2 command current Ia2 is supplied to the second electromagnetic coil 112, and the second movable sleeve 108 is thereby moved toward the rear wheel 16R, so that the torque is generated for causing the synchronization mechanism 138 to increase the rotation speed N2 of the second ring gear 94. When the ACT2 command current Ia2 is no longer supplied to the second electromagnetic coil 112, the second movable sleeve 108 is moved toward the rear wheel 16L by the urging force of the second spring 126, and the second dog clutch 38 is engaged. Time t0 shown in FIG. 4 is the time when the energization control is started.

Figure 5:
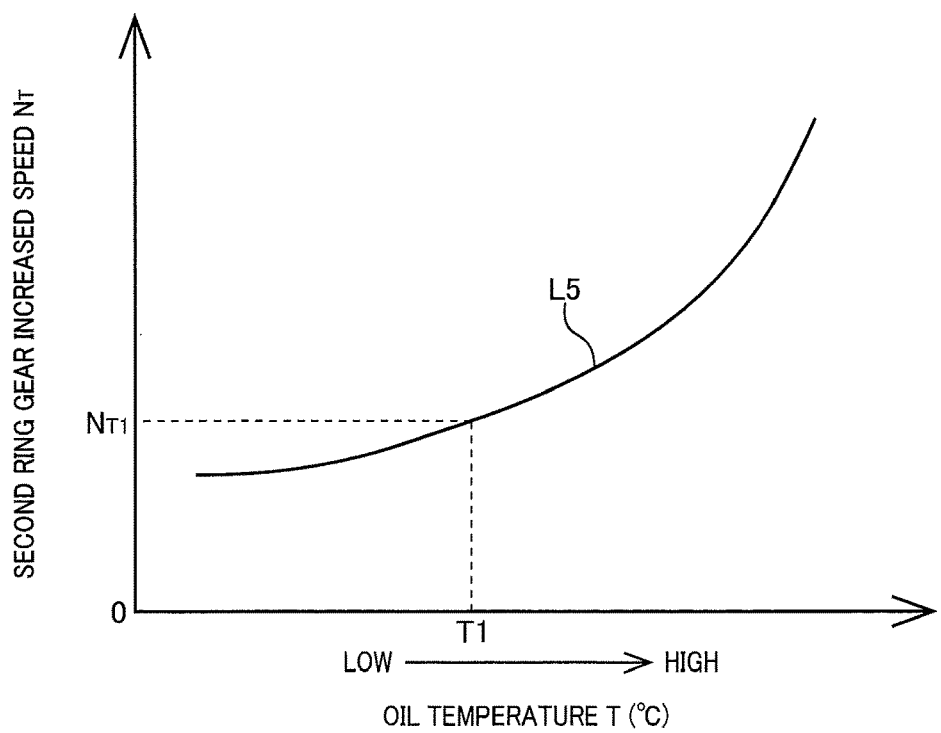
FIG. 5 is a diagram showing a first map preliminarily stored in a current command value storage portion of an electronic control device included in the four-wheel drive vehicle of FIG. 1.
Figures 6, 7:
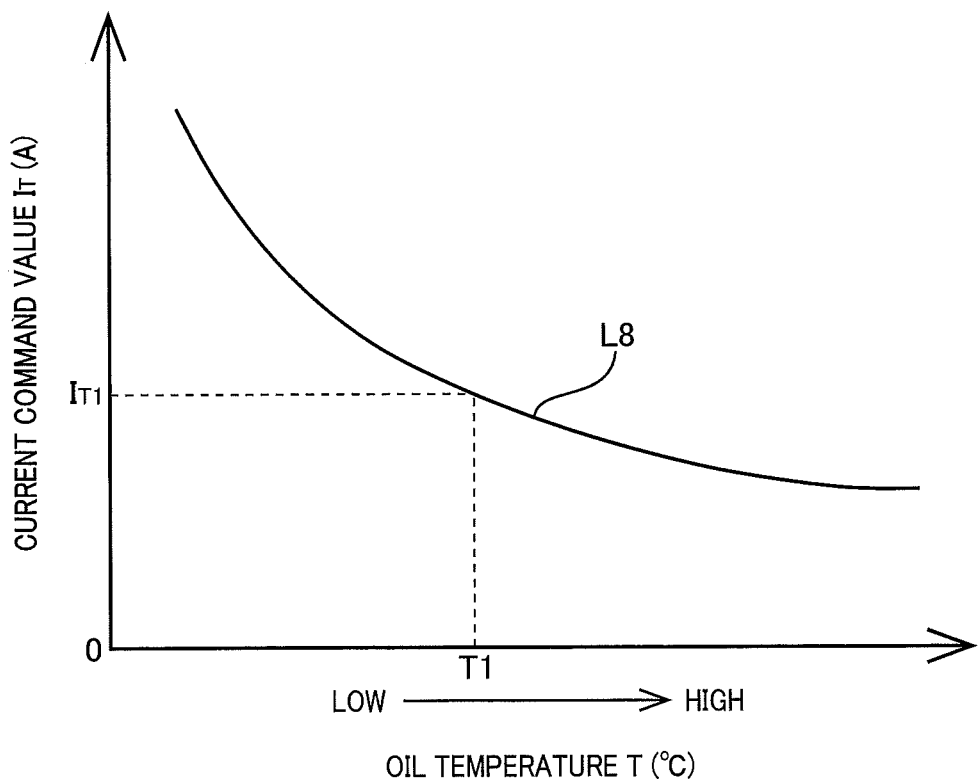
FIG. 6 is a diagram showing a second map preliminarily stored in the current command value storage portion of the electronic control device included in the four-wheel drive vehicle of FIG. 1.
FIG. 7 is a diagram showing a third map preliminarily stored in the current command value storage portion of the electronic control device included in the four-wheel drive vehicle of FIG. 1.
Figure 8:
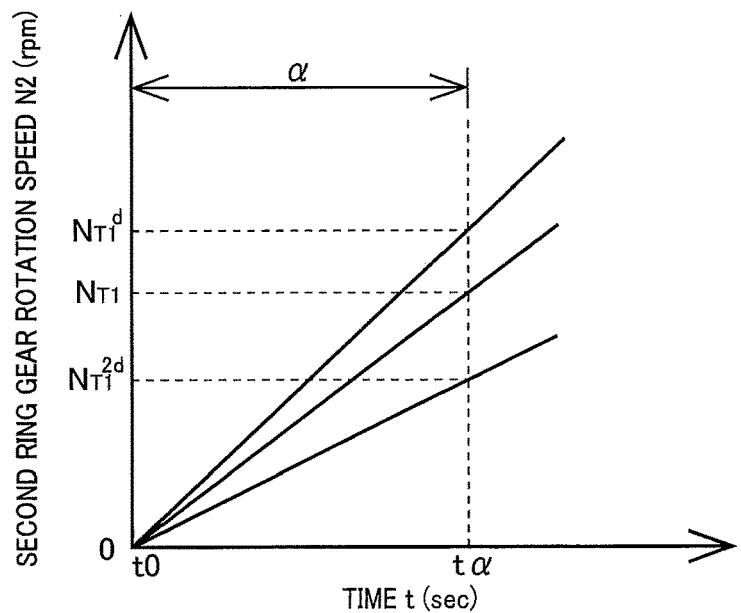
FIG. 8 is a diagram for explaining an increase rate of a rotation speed of a second ring gear shown in the first map of FIG. 5.

For example, the current command value storage portion 162 stores a first map shown in FIG. 5, a second map shown in FIG. 6, and a third map shown in FIG. 7. As shown in FIG. 5, for example, the first map is a map showing an increase rate $N_T$ of the rotation speed N2 of the second ring gear 94 when the second electromagnetic coil 112 of the second electromagnetic actuator 110 is subjected to the energization control with a predetermined current command value $I_{Tc1}$ (A) set in advance regardless of the oil temperature T (° C.) of the oil. As shown in FIG. 8, the increase rate $N_T$ is an increased amount i.e. a change amount of the rotation speed N2 of the second ring gear 94 in a predetermined time period α (sec) between time t0 and time tα, where the time t0 is a time when the energization control is started, and the time tα is a time when the predetermined time period α (sec) set in advance has elapsed from the time t0. Hereinafter, the increase rate $N_T$ of the rotation speed N2 is just referred to as "increase rate $N_T$". The predetermined current command value $I_{Tc1}$ (A) is the current command value $I_T$ (A) set in advance such that when the oil temperature T (° C.) of the oil is a predetermined oil temperature Tc1 (° C.), an increase rate $N_{Tc1}$ of the second ring gear 94 becomes equal to a target increase rate (predetermined rate) Nuptg described later. When the oil temperature T (° C.) of the oil increases as shown in the first map of FIG. 5, for example, a resistance in stirring the oil in the second casing 98 by the second ring gear 94 is reduced, and therefore, the increase rate $N_T$ of the second ring gear 94 becomes higher as the oil temperature T (° C.) of the oil increases.

As shown in FIG. 6, for example, the second map is a map with which the current command value $I_T$ (A) is changed depending on the oil temperature T (° C.) of the oil such that the increase rate $N_T$ of the second ring gear 94 becomes equal to the preset target increase rate Nuptg regardless of the oil temperature T (° C.) of the oil. The target increase rate Nuptg is an ideal increase rate $N_T$ of the second ring gear 94 set in advance so as to suitably reduce a sound generated from the second dog clutch 38 in engaging thereof and suitably shorten a switching time required until the second dog clutch 38 is switched from the released state to the engaged state during provision of the energization control. In the second map of FIG. 6, since the increase rate $N_T$ of the second ring gear 94 becomes faster as the oil temperature T (° C.) of the oil becomes higher as shown in the first map of FIG. 5, the current command value $I_T$ (A) becomes smaller as the oil temperature T (° C.) of the oil increases so as to maintain the increase rate $N_T$ of the second ring gear 94 at the target increase rate Nuptg.

As shown in FIG. 7, for example, the third map is a map showing the increase rate $N_T$ of the second ring gear 94 in the first map of FIG. 5 and the current command value $I_T$ (A) in the second map of FIG. 6 corresponding to the oil temperature T (° C.) of the oil for every 10° C. Therefore, the third map of FIG. 7 is a map formed from data of the first map of FIG. 5, i.e., the increase rate $N_T$ of the second ring gear 94, and data of the second map of FIG. 6, i.e., the current command value $I_T$ (A).

The mode switching portion 164 selectively switches the running mode from the two-wheel drive mode to the four-wheel drive mode, or from the four-wheel drive mode to the two-wheel drive mode, depending on a running state of the vehicle 10.

When the mode switching portion 164 switches the two-wheel drive mode to the four-wheel drive mode, the clutch control portion 166 calculates the current command value $I_T$ (A) from the oil temperature T (° C.) of the oil detected from the oil temperature sensor 150 at the time of switching from the two-wheel drive mode to the four-wheel drive mode by using the second map of FIG. 6 stored in the current command value storage portion 162 and provides the energization control of the second electromagnetic coil 112 of the second electromagnetic actuator 110 based on the calculated current command value $I_T$ (A) such that the second dog clutch 38 is suitably switched from the released state to the engaged state. When the second dog clutch 38 is switched from the released state to the engaged state, the clutch control portion 166 supplies the coupling drive current Icp (A) of a predetermined current Icp1 (A) to the actuator of the control coupling 96 such that the control coupling 96 is switched from the released state to the engaged state. The predetermined current Icp1 (A) is the coupling drive current Icp (A) capable of generating a transmission torque with which the drive power from the rear wheels 16L, 16R can be transmitted through the control coupling 96 to the first ring gear 48 in the engaged state of the second dog clutch 38.

The clutch control portion 166 includes a differential rotation determining portion 166a. When the second dog clutch 38 is switched from the released state to the engaged state by the clutch control portion 166, the differential rotation determining portion 166a determines whether a rotation speed difference Ns between the rotation speed N1 (rpm) of the first ring gear 48 in the first dog clutch 26 and a rotation speed Nk1 (rpm) of the input shaft 44 is equal to or less than a predetermined rotation speed Nsc set in advance. The predetermined rotation speed Nsc (rpm) is the rotation speed difference Ns of the first dog clutch 26 relatively reduced to such an extent that a generated sound is suitably reduced when the first movable sleeve 56 is moved from the first non-meshing position to the first meshing position in the first dog clutch 26, i.e., when the first dog clutch 26 is switched from the released state to the engaged state. In the differential rotation determining portion 166a, the rotation speed N1 (rpm) of the first ring gear 48 is obtained from the rotation speed sensor 148, and the rotation speed Nk1 (rpm) of the input shaft 44 is calculated from an average rotation speed ((Wfl+Wfr)/2) of the wheel speeds Wfl, Wfr (rpm) of the front wheels 14L, 14R.

If the differential rotation determining portion 166a determines that the rotation speed difference Ns of the first dog clutch 26 is equal to or less than the predetermined rotation speed Nsc, the clutch control portion 166 controls the ACT1 command current Ia1 supplied to the first electromagnetic coil 60 of the first electromagnetic actuator 58 such that the first movable sleeve 56 is moved from the first non-meshing position to the first meshing position in the first dog clutch 26, i.e., such that the first dog clutch 26 is switched from the released state to the engaged state.

As shown in FIG. 1, the learning control portion 168 includes a learning start determining portion 168a and a learning value acquiring portion 168b. The learning control portion 168 provides a learning control in which the second dog clutch 38 is switched from the released state to the engaged state by the clutch control portion 166 in the two-wheel drive state to learn a characteristic value indicative of an increasing characteristic of the rotation speed N2 of the second ring gear 94 with respect to the current command value $I_T$ (A), i.e., a learning control of learning the increase rate $N_T$ of the rotation speed N2 of the second ring gear 94 with respect to the current command value $I_T$ (A).

The learning start determining portion 168a determines whether the learning control is started when the 2WD determining portion 160 determines that the vehicle 10 is in the two-wheel drive state. For example, when a predetermined time tc (sec) has elapsed from a previous provision of the learning control, the learning start determining portion 168a determines that the learning control has been started. If the learning control is not previously provided, i.e., if the learning control is performed for the first time, the learning start determining portion 168a determines that the learning control is started when the 2WD determining portion 160 determines that the vehicle 10 is in the two-wheel drive state. The predetermined time tc (sec) is changed so that the learning is properly started, depending on changes in the vehicle speed V (km/h) detected by the vehicle speed sensor 152 as well as the acceleration Gfr (m/s²) in the vehicle longitudinal direction and the acceleration Glr (m/s²) in the vehicle width direction detected by the acceleration sensor 154. When the oil temperature T (° C.) of the oil detected from the oil temperature sensor 150 is equal to or less than a predetermined oil temperature Tc2 (° C.) set in advance, the learning start determining portion 168a determines that the learning control is not started.

If the 2WD determining portion 160 determines that the vehicle 10 is in the two-wheel drive state and the learning start determining portion 168a determines that the learning control is started, the clutch control portion 166 calculates the current command value $I_T$ (A) from the oil temperature T (° C.) of the oil detected from the oil temperature sensor 150 by using the second map of FIG. 6 stored in the current command value storage portion 162 and provides the energization control of the second electromagnetic coil 112 of the second electromagnetic actuator 110 based on the calculated current command value $I_T$ (A) such that the second dog clutch 38 is switched from the released state to the engaged state. For example, if the oil temperature T (° C.) of the oil detected by the oil temperature sensor 150 is, for example, an oil temperature T1 (° C.) when the learning start determining portion 168a determines that the learning control is started, the clutch control portion 166 supplies the ACT2 command current Ia2 (A) indicated by the solid line L1 of FIG. 4 to the second electromagnetic coil 112 based on the current command value $I_{T1}$ (A) as shown in the second map of FIG. 6 to switch the second dog clutch 38 from the released state to the engaged state. If the 2WD determining portion 160 determines that the vehicle 10 is in the two-wheel drive state and the learning start determining portion 168a determines that the learning control is started, the clutch control portion 166 does not supply the ACT1 command current Ia1 (A) to the first electromagnetic coil 60 of the first electromagnetic actuator 58 and does not supply the coupling drive current Icp (A) to the actuator of the control coupling 96. As a result, the first dog clutch 26 and the control coupling 96 are each brought into the released state.

If the 2WD determining portion 160 determines that the vehicle 10 is in the two-wheel drive state and the learning start determining portion 168a determines that the learning control is started and the second dog clutch 38 is switched from the released state to the engaged state, the clutch control portion 166 provides the energization control of the second electromagnetic coil 112 of the second electromagnetic actuator 110 based on the current command value $I_T$ (A) to switch the second dog clutch 38 from the engaged state to the released state.

If the learning start determining portion 168a determines that the learning control is started, the learning value acquiring portion 168b measures, i.e., learns, the oil temperature T (° C.) of the oil detected by the oil temperature sensor 150 when the learning start determining portion 168a determines that the learning control is started, i.e., when the energization control is started, and the increase rate $N_T$ of the second ring gear 94 increased from when the energization control is started until when the predetermined time period α (sec) has elapsed.

As shown in FIG. 1, the current command value storage portion 162 includes an updating portion 162a. When the learning value acquiring portion 168b measures the oil temperature T (° C.) of the oil and the increase rate $N_T$ of the second ring gear 94, the updating portion 162a updates the current command value $I_T$ (A) stored by the current command value storage portion 162 based on the oil temperature T (° C.) of the oil and the increase rate $N_T$ of the second ring gear 94 that are measured such that the increase rate $N_T$ becomes equal to the target increase rate Nuptg.

For example, if the oil temperature T (° C.) of the oil measured by the learning value acquiring portion 168b is the oil temperature T1 (° C.) and the increase rate $N_T$ of the second ring gear 94 measured by the learning value acquiring portion 168b is an increase rate $N_{T1}{}^d$ as shown in FIG. 8, the updating portion 162a uses, for example, Eq. (1) and FIG. 10, to update the current command value $I_{T1}$ (A) corresponding to the oil temperature T1 (° C.), i.e., a point A1, to the current command value $I_{T1}{}^d$ (A), i.e., a point A2.

$$I_{T1}{}^d = I_{T1} \times (1/Rup) \qquad (1)$$

$$Rup = N_{T1}{}^d / N_{T1} \qquad (2)$$

Rup shown in Eq. (1) is a change ratio of the increase rate $N_{T1}{}^d$ of the second ring gear 94 corresponding to the oil temperature T1 (° C.) measured by the learning value acquiring portion 168b and is obtained by Eq. (2). "$N_{T1}$" shown in Eq. (2) is the increase rate $N_T$ of the second ring gear 94 corresponding to the oil temperature T1 (° C.) of the first map shown in FIG. 5 preliminarily stored by the current command value storage portion 162. A solid line L2 shown in FIG. 4 is a line indicative of the ACT2 command current Ia2 (A) supplied to the second electromagnetic coil 112 when the second electromagnetic coil 112 is subjected to the energization control with the current command value $I_{T1}{}^d$ (A).

Figure 9:
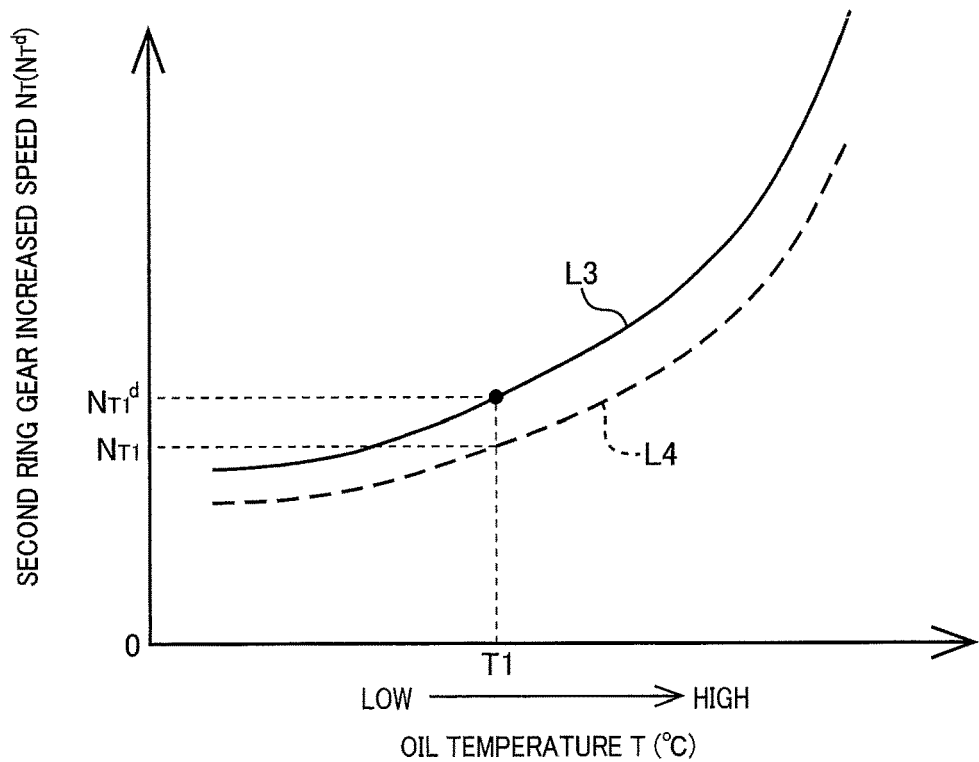
FIG. 9 is a diagram showing the first map of FIG. 5 updated by an updating portion of the electronic control device included in the four-wheel drive vehicle of FIG. 1.

When the increase rate Rup is calculated with Eq. (2), the updating portion 162a uses Eq. (3) to estimate an increase rate $N_T{}^d$ of the second ring gear 94 corresponding to the oil temperature T (° C.) other than the oil temperature T1 (° C.) as indicated by a solid line L3 in the first map of FIG. 9. The solid line L3 shown in the first map of FIG. 9 is a line indicative of the increase rate $N_T{}^d$ of the second ring gear 94 estimated with Eq. (3). A broken line L4 shown in the first map of FIG. 9 is a line virtually representing a solid line L5 shown in the first map of FIG. 5. When the increase rate $N_T{}^d$ of the second ring gear 94 is estimated as indicated by the solid line L3, the updating portion 162a updates the increase rate $N_T$ of the second ring gear 94 of the broken line L4 preliminarily stored in the first map of FIG. 9 to the estimated increase rate $N_T{}^d$ (rpm) of the second ring gear 94 of the solid line L3 and stores the updated first map shown in FIG. 9 in the current command value storage portion 162.

$$N_T{}^d = N_T \times Rup \qquad (3)$$

Figures 10, 11:
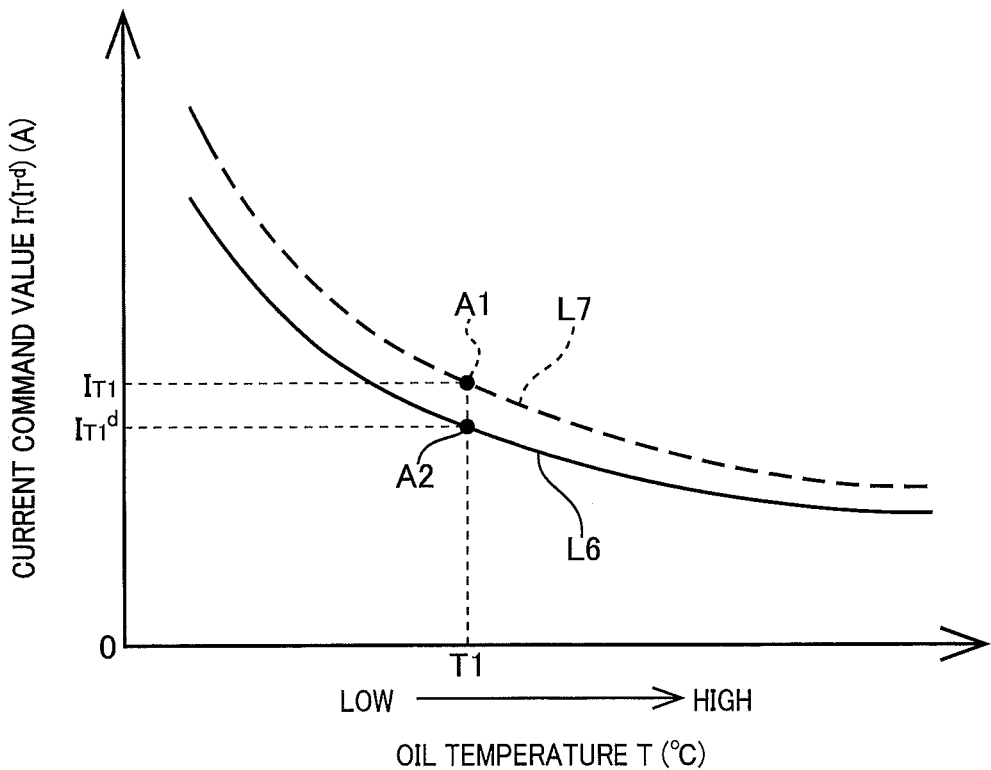
FIG. 10 is a diagram showing the second map of FIG. 6 updated by the updating portion of the electronic control device included in the four-wheel drive vehicle of FIG. 1.
FIG. 11 is a diagram showing the third map of FIG. 7 updated by the updating portion of the electronic control device included in the four-wheel drive vehicle of FIG. 1.

When the increase rate Rup is calculated with Eq. (2), the updating portion 162a uses Eq. (4) to estimate a current command value $I_T{}^d$ (A) corresponding to the oil temperature T (° C.) other than the oil temperature T1 (° C.) as indicated by a solid line L6 in the second map of FIG. 10. The solid line L6 shown in the second map of FIG. 10 is a line indicative of the current command value $I_T{}^d$ (A) estimated with Eq. (4). A broken line L7 shown in the second map of FIG. 10 is a line virtually indicating a solid line L8 shown in the second map of FIG. 6. When the current command value $I_T{}^d$ (A) is estimated as indicated by the solid line L6, the updating portion 162a updates the current command value $I_T$ of the broken line L7 preliminarily stored in the second map of FIG. 10 to the estimated current command value $I_T{}^d$ (A) of the solid line L6 and stores the updated second map of FIG. 10 in the current command value storage portion 162.

$$I_T{}^d = I_T \times (1/Rup) \qquad (4)$$

When the learning control is provided and, for example, the second map of FIG. 6 stored in the current command value storage portion 162 is updated, the clutch control portion 166 provides the energization control of the second electromagnetic coil 112 based on the current command value $I_T{}^d$ (A) calculated from the updated second map of FIG. 10 when the mode switching portion 164 switches the two-wheel drive mode to the four-wheel drive mode.

After the updating portion 162a updates the first map of FIG. 5 and the second map of FIG. 6, the updating portion 162a updates the third map of FIG. 7 based on the increase rate $N_T{}^d$ of the updated first map shown in FIG. 9 and the current command value $I_T{}^d$ (A) of the updated second map shown in FIG. 10 and stores the updated third map shown in FIG. 11 in the current command value storage portion 162.

If the learning control is provided again and, for example, the oil temperature T (° C.) of the oil is measured by the learning value acquiring portion 168b as the oil temperature T1 (° C.) and the increase rate $N_T$ of the second ring gear 94 is measured as an increase rate $N_{T1}{}^{2d}$ as shown in FIG. 8, the increase rate Rup is calculated by the updating portion 162a as an increase ratio ($N_{T1}{}^{2d}/N_{T1}{}^d$) of an increase rate $N_T{}^{2d}$ relative to the increase rate $N_{T1}{}^d$, where the increase rate $N_{T1}{}^d$ is the increase rate $N_T{}^d$ in the first map of FIG. 9 showing the updated solid line L3. The updating portion 162a updates each of the solid line L3 of the first map of FIG. 9, the solid line L6 of the second map of FIG. 10, and the third map of FIG. 11 based on the increase rate Rup ($N_{T1}{}^{2d}/N_{T1}{}^d$). A solid line L9 shown in FIG. 4 is a line indicative of the ACT2 command current Ia2 supplied to the second electromagnetic coil 112 when the second electromagnetic coil 112 is subjected to the energization control with a current command value $I_{T1}{}^{2d}$ (A) updated based on the increase rate $N_{T1}{}^{2d}$ measured by the learning value acquiring portion 168b.

Figure 12:
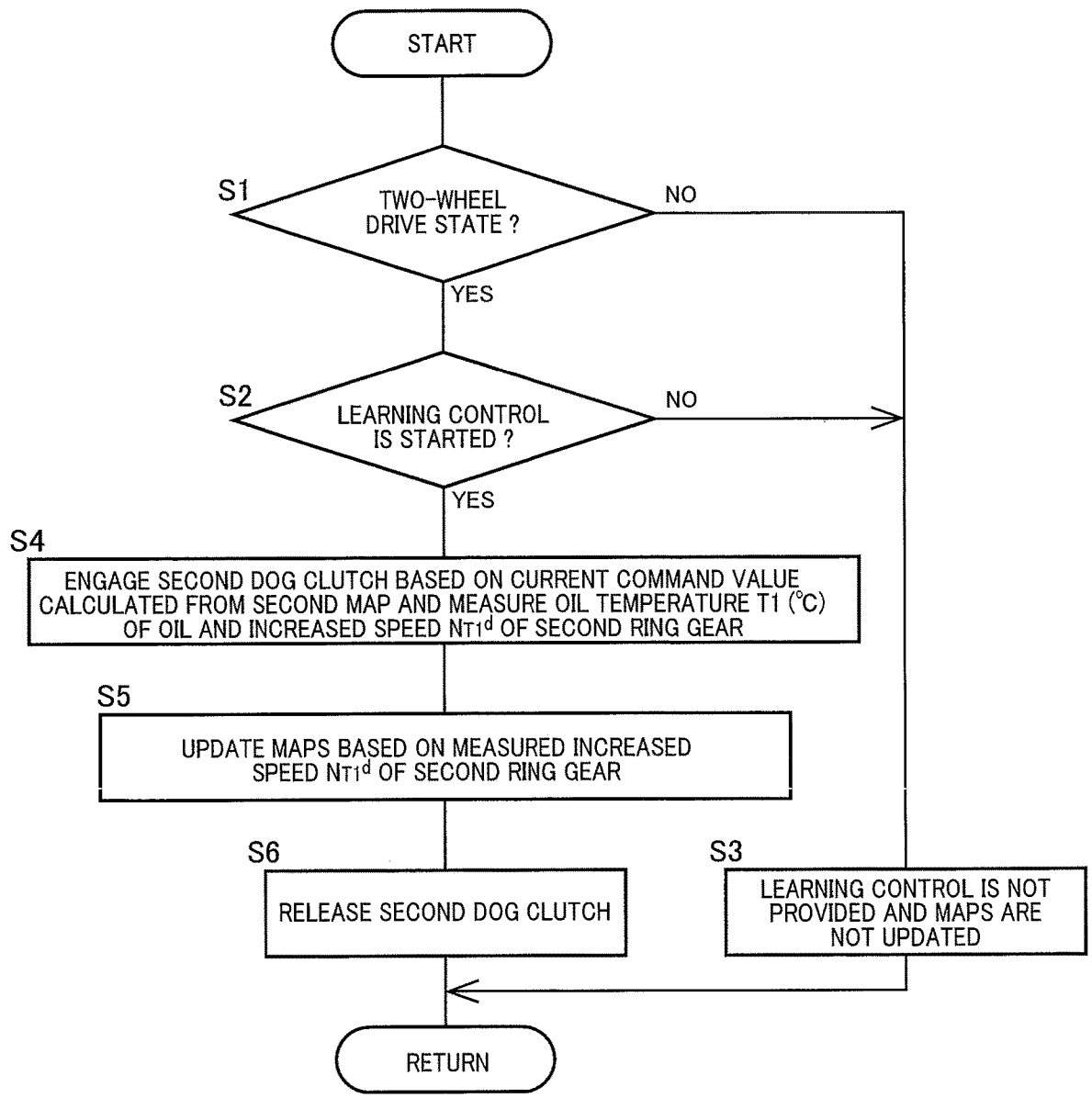
FIG. 12 is a flowchart for explaining an operation in the electronic control device of FIG. 1 from when learning control is provided during two-wheel drive running until when the first map of FIG. 5, the second map of FIG. 6, and the third map of FIG. 7 are each updated.

FIG. 12 is a flowchart for explaining an operation in the electronic control device 100 from when the learning control is provided during two-wheel drive running until when the first map of FIG. 5, the second map of FIG. 6, and the third map of FIG. 7 are each updated.

First, at step (hereinafter, step will be omitted) S1 corresponding to the function of the 2WD determining portion 160, it is determined whether the vehicle 10 is in the two-wheel drive state. If the determination of S1 is affirmative, i.e., if it is determined that the vehicle 10 is in the two-wheel drive state, S2 corresponding to the function of the learning start determining portion 168a is executed. If the determination of S1 is negative, i.e., if it is determined that the vehicle 10 is in the four-wheel drive state, S3 corresponding to the functions of the learning control portion 168 and the updating portion 162a is executed. At S2, it is determined whether the learning control is started. If the determination of S2 is affirmative, S4 corresponding to the functions of the clutch control portion 166 and the learning value acquiring portion 168b is executed. If the determination of S2 is negative, S3 is executed. At S3, the learning control is not provided, and the first map of FIG. 5, the second map of FIG. 6, and the third map of FIG. 7 are not updated.

At S4, the second dog clutch 38 is engaged based on, for example, the current command value $I_T$ (A) calculated from the second map of FIG. 6, and the oil temperature T (° C.) of the oil, for example, the oil temperature T1 (° C.), and the increase rate $N_T^d$ of the second ring gear 94, for example, the increase rate $N_{T1}^d$, are measured.

Subsequently, at S5 corresponding to the functions of the current command value storage portion 162 and the updating portion 162a, the first map of FIG. 5, the second map of FIG. 6, and the third map of FIG. 7 are each updated based on the increase rate $N_{T1}^d$ measured at S4, and the first map of FIG. 9, the second map of FIG. 10, and the third map of FIG. 11 after the update are each stored. Subsequently, at S6 corresponding to the function of the clutch control portion 166, the second dog clutch 38 is released.

As described above, the four-wheel drive vehicle 10 of this example includes the electronic control device 100 providing the energization control of the second electromagnetic coil 112 based on the preliminarily stored current command value $I_T$ to engage the second dog clutch 38 of the second connecting/disconnecting device 36, and the electronic control device 100 learns the increase rate $N_{T1}^d$ of the rotation speed N2 of the second ring gear 94 with respect to the current command value $I_{T1}$ and updates the current command value $I_{T1}$ such that the increase rate $N_{T1}^d$ of the rotation speed N2 of the second ring gear 94 becomes equal to the target increase rate Nuptg based on the learned increase rate $N_{T1}^d$, so that when the second dog clutch 38 of the second connecting/disconnecting device 36 is engaged, the increase rate $N_T^d$ of the rotation speed N2 of the second ring gear 94 can be maintained at the target increase rate Nuptg. Therefore, when the second dog clutch 38 disposed in the second connecting/disconnecting device 36 is engaged, the sound emitted from the second dog clutch 38 can suitably be reduced, and time required until engaging the second dog clutch 38 can suitably be shortened.

According to the four-wheel drive vehicle 10 of this example, the power transmission path 32 includes the control coupling 96 controlling the transmission torque transmitted from the engine 12 to the rear wheels 16L, 16R during the four-wheel drive running, and the electronic control device 100 learns the increase rate $N_{T1}^d$ of the rotation speed N2 of the second ring gear 94 while the power transmission path 32 and the engine 12 are disconnected by the first connecting/disconnecting device 24 and the control coupling 96 is released. Therefore, even if the second dog clutch 38 of the second connecting/disconnecting device 36 is engaged so as to learn the increase rate $N_{T1}^d$ of the rotation speed N2 of the second ring gear 94, only a part of the power transmission path 32 is connected to the rear wheels 16L, 16R in a power transmittable manner, and therefore, for example, as compared to a four-wheel drive vehicle not including the control coupling 96 in the power transmission path 32 so that the power transmission path 32 is entirely coupled to the rear wheels 16L, 16R in a power transmittable manner when the second dog clutch 38 of the second connecting/disconnecting device 36 is engaged, the mass of the members increased in rotation by engaging the second dog clutch 38 of the second connecting/disconnecting device 36 can suitably be reduced. This can appropriately suppress a drive power loss at the time of learning of the increase rate of the rotation speed N2 of the second ring gear 94 and therefore can suitably increase the number of times of learning, i.e., a frequency of learning, of the increase rate of the rotation speed N2 of the second ring gear 94 during vehicle running.

According to the four-wheel drive vehicle 10 of this example, the second ring gear 94 is rotatably disposed in the second casing 98 housing the second connecting/disconnecting device 36 to stir the oil stored in the second casing 98, the electronic control device 100 stores the plurality of the current command values $I_T$ (A) corresponding to the different oil temperatures T (° C.) of the oil, and the electronic control device 100 provides the energization control of the second electromagnetic coil 112 based on the current command value $I_T$ (A) corresponding to the oil temperature T (° C.) of the oil to engage the second dog clutch 38 of the second connecting/disconnecting device 36 and updates the current command value $I_{T1}$ (A) corresponding to the oil temperature T (° C.) of the oil at the time of learning of the increase rate $N_{T1}^d$ of the rotation speed N2 of the second ring gear 94. Therefore, even if the rotation resistance of the second ring gear 94 is changed due to a change in the oil temperature of the oil, the increase rate $N_T^d$ of the rotation speed N2 of the second ring gear 94 can suitably be maintained at the target increase rate Nuptg.

According to the four-wheel drive vehicle 10 of this example, the electronic control device 100 updates each of the plurality of the current command values $I_T$ (A) corresponding to the oil temperatures T (° C.) of the oil based on the learned increase rate $N_{T1}^d$ of the rotation speed N2 of the second ring gear 94. Therefore, the electronic control device 100 can update not only one current command value $I_{T1}$ (A) corresponding to the oil temperature T1 (° C.) of the oil at the time of learning of the increase rate $N_{T1}^d$ of the rotation speed N2 of the second ring gear 94 but also the plurality of the current command values $I_T$ (A) corresponding to a plurality of the oil temperatures T (° C.) of the oil other than the oil temperature T1 (° C.) of the oil. As a result, even if the oil temperature T (° C.) of the oil changes during vehicle running, the increase rate $N_T^d$ of the rotation speed N2 of the second ring gear 94 can suitably be maintained at the target increase rate Nuptg.

According to the four-wheel drive vehicle 10 of this example, the increase rate $N_T$ of the rotation speed N2 of the second ring gear 94 is the increase rate of the rotation speed N2 of the second ring gear 94 increased at the time of engagement of the second dog clutch 38 of the second connecting/disconnecting device 36 from when the energization control is started until when the predetermined time period α (sec) has elapsed. Therefore, when the second dog clutch 38 of the second connecting/disconnecting device 36 is engaged, the increase rate $N_{T1}^d$ of the rotation speed N2 of the second ring gear 94 can suitably be learned.

Other examples of the present invention will be described in detail with reference to the drawings. In the following description, the portions common to the examples are denoted by the same reference numerals and will not be described.

Second Example

Figure 13:
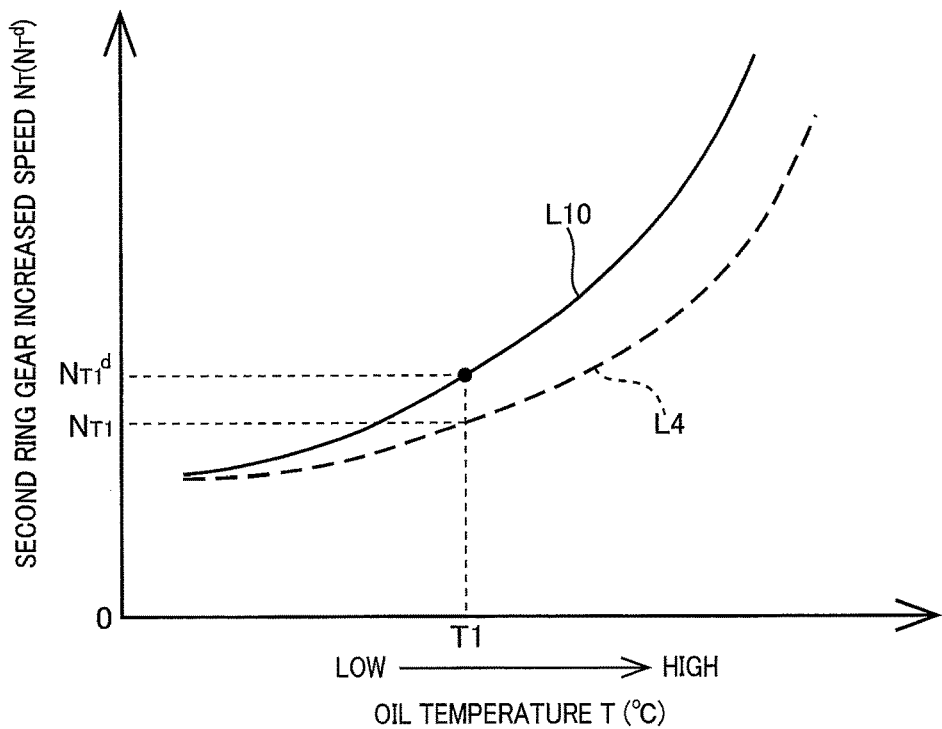
FIG. 13 is a diagram showing another example, i.e., a second example, of the present invention and is a diagram showing the first map updated by the updating portion of the electronic control device.
Figure 15:
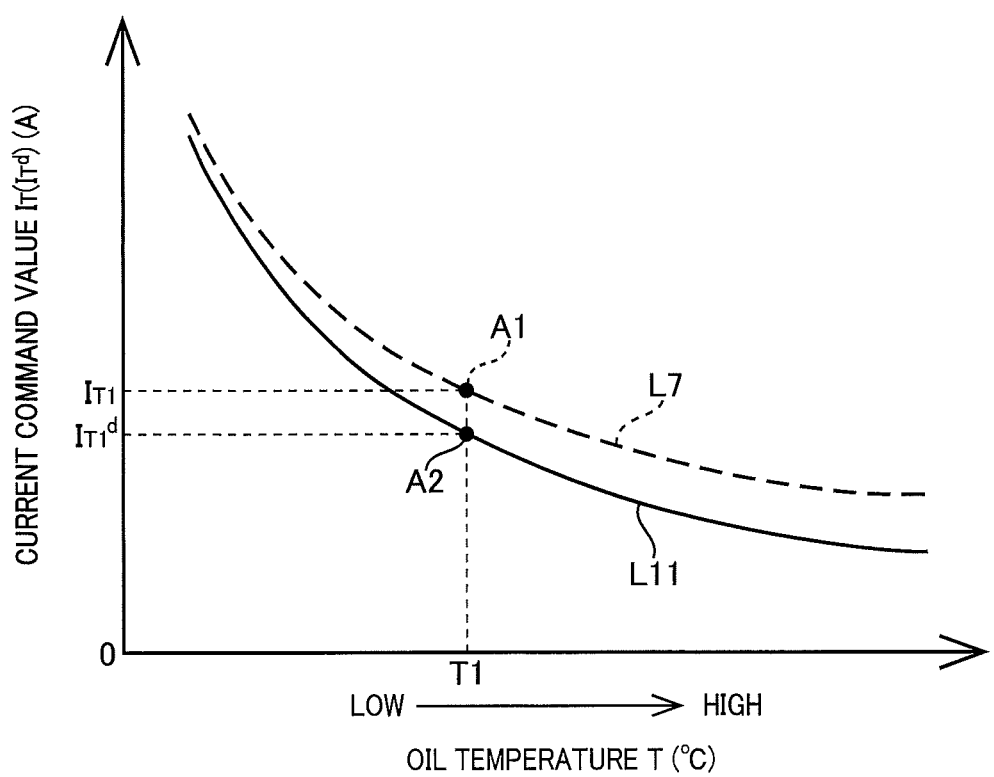
FIG. 15 is a diagram showing the second example of the present invention and is a diagram showing the second map updated by the updating portion of the electronic control device.

A four-wheel drive vehicle of this example is substantially the same as the four-wheel drive vehicle 10 of the first example described above except that differences exist in an estimating method of estimating the increase rate $N_T^d$ of the second ring gear 94 corresponding to the oil temperature T (° C.) other than the oil temperature T1 (° C.) as shown in a first map of FIG. 13 when the oil temperature T1 (° C.) and the increase rate $N_T^d$ are measured by the learning value acquiring portion 168b in the updating portion 162a, and an estimating method of estimating the current command value $I_T^d$ (A) corresponding to the oil temperature T (° C.) other than the oil temperature T1 (° C.) as shown in a second map of FIG. 15 when the oil temperature T1 (° C.) and the increase rate $N_T^d$ are measured by the learning value acquiring portion 168b in the updating portion 162a. As with the first example, the four-wheel drive vehicle of this example provides the effect of maintaining the increase rate $N_T^d$ of the second ring gear 94 at the target increase rate Nuptg when the second dog clutch 38 of the second connecting/disconnecting device 36 is engaged.

When the oil temperature T1 (° C.) and the increase rate $N_{T1}^d$ of the second ring gear 94 are measured by the learning value acquiring portion 168b, the updating portion 162a estimates the increase rate $N_T^d$ of the second ring gear 94 corresponding to the oil temperature T (° C.) other than the oil temperature T1 (° C.) by using Eq. (5) as indicated by a solid line L10 of the first map of FIG. 13.

$$N_T^d = N_T \times Rup \times b \qquad (5)$$

Figure 14:
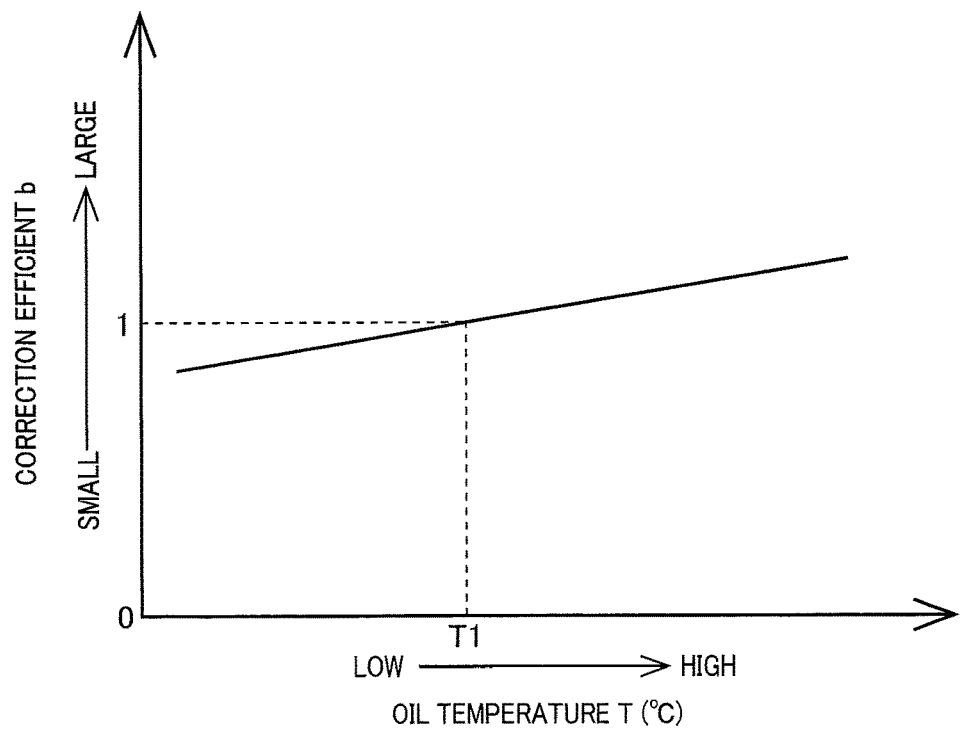
FIG. 14 is an example of a map for calculating a correction coefficient used for estimating the increase rate of the rotation speed of the second ring gear in the updated first map of FIG. 13.

In Eq. (5), "b" is a correction coefficient varying depending on the oil temperature T (° C.) and is calculated from the oil temperature T (° C.) with a map shown in FIG. 14, for example.

When the oil temperature T1 (° C.) and the increase rate $N_{T1}^d$ of the second ring gear 94 are measured by the learning value acquiring portion 168b, the updating portion 162a estimates the current command value $h^d$ (A) corresponding to the oil temperature T (° C.) other than the oil temperature T1 (° C.) by using Eq. (6) as indicated by a solid line L11 of the second map of FIG. 15.

$$I_T^d = I_T \times (1/(Rup \times b)) \qquad (6)$$

Third Example

Figure 16:
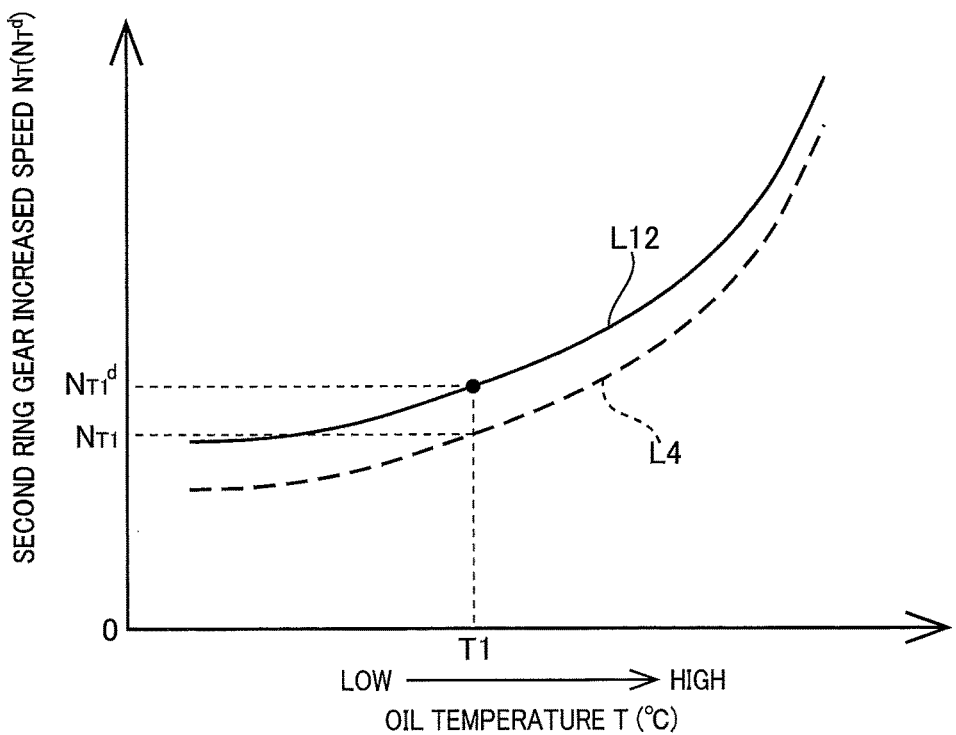
FIG. 16 is a diagram showing another example, i.e., a third example, of the present invention and is a diagram showing the first map updated by the updating portion of the electronic control device.
Figure 17:
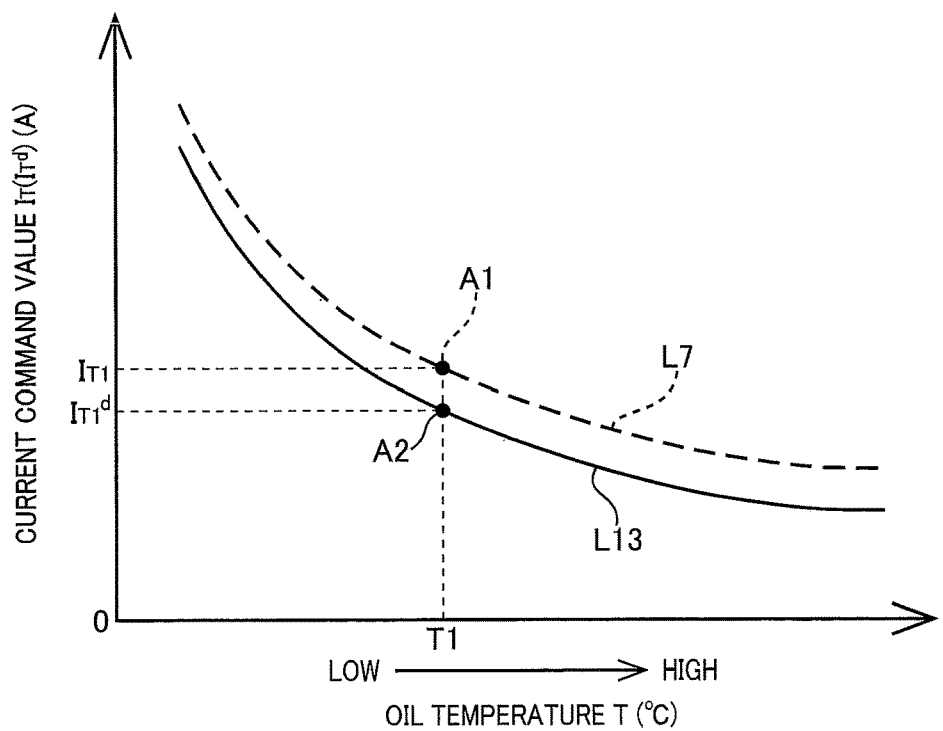
FIG. 17 is a diagram showing the third example of the present invention and is a diagram showing the second map updated by the updating portion of the electronic control device.

The four-wheel drive vehicle of this example is substantially the same as the four-wheel drive vehicle 10 of the first example described above except that differences exist in an estimating method of estimating the increase rate $N_T^d$ of the second ring gear 94 corresponding to the oil temperature T (° C.) other than the oil temperature T1 (° C.) as shown in the first map of FIG. 16 when the oil temperature T1 (° C.) and the increase rate $N_T^d$ are measured by the learning value acquiring portion 168b in the updating portion 162a and an estimating method of estimating the current command value $I_T^d$ (A) corresponding to the oil temperature T (° C.) other than the oil temperature T1 (° C.) as shown in the second map of FIG. 17 when the oil temperature T1 (° C.) and the increase rate $N_T^d$ are measured by the learning value acquiring portion 168b in the updating portion 162a. As with the first example, the four-wheel drive vehicle of this example provides the effect of maintaining the increase rate $N_T^d$ of the second ring gear 94 at the target increase rate Nuptg when the second dog clutch 38 of the second connecting/disconnecting device 36 is engaged.

When the oil temperature T1 (° C.) and the increase rate $N_{T1}^d$ of the second ring gear 94 are measured by the learning value acquiring portion 168b, the updating portion 162a estimates the increase rate $N_T^d$ of the second ring gear 94 corresponding to the oil temperature T (° C.) other than the oil temperature T1 (° C.) by using Eq. (7) as indicated by a solid line L12 of the first map of FIG. 16.

$$N_T^d = N_T + (N_{T1}^d - N_{T1}) \qquad (7)$$

When the oil temperature T1 (° C.) and the increase rate $N_{T1}^d$ of the second ring gear 94 are measured by the learning value acquiring portion 168b, the updating portion 162a estimates the current command value $I_T^d$ (A) corresponding to the oil temperature T (° C.) other than the oil temperature T1 (° C.) by using Eq. (8) as indicated by a solid line L13 of the second map of FIG. 17.

$$I_T^d = I_T - e(N_{T1}^d - N_{T1}) \qquad (8)$$

In Eq. (8), "e" is a preset correction coefficient.

Fourth Example

Figure 18:
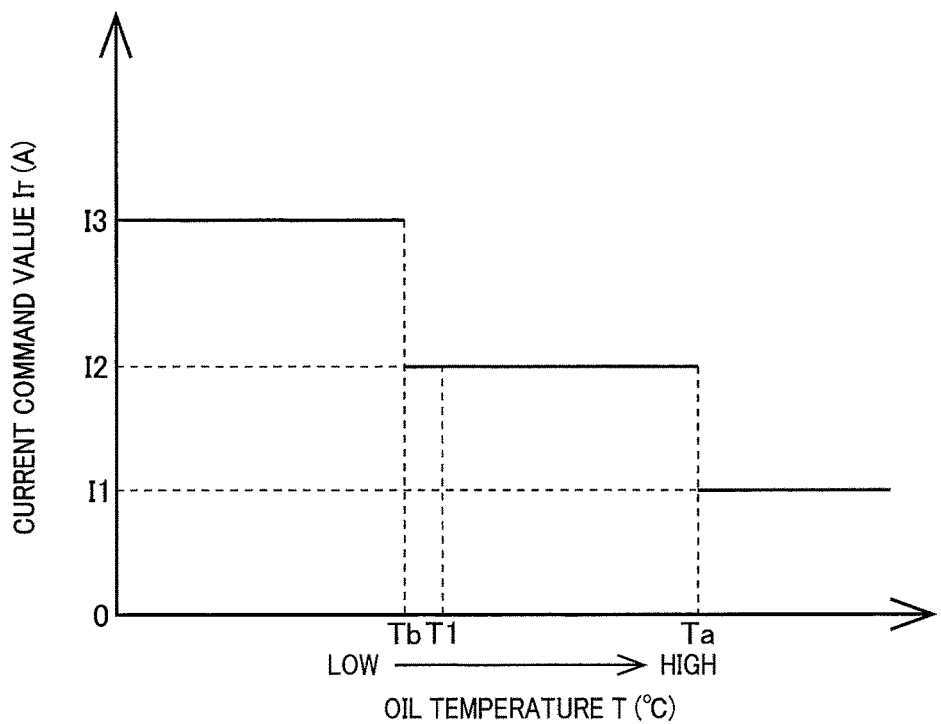
FIG. 18 is a diagram showing another example, i.e., a fourth example, of the present invention and is a diagram showing the second map preliminarily stored in the current command value storage portion of the electronic control device.
Figure 19:
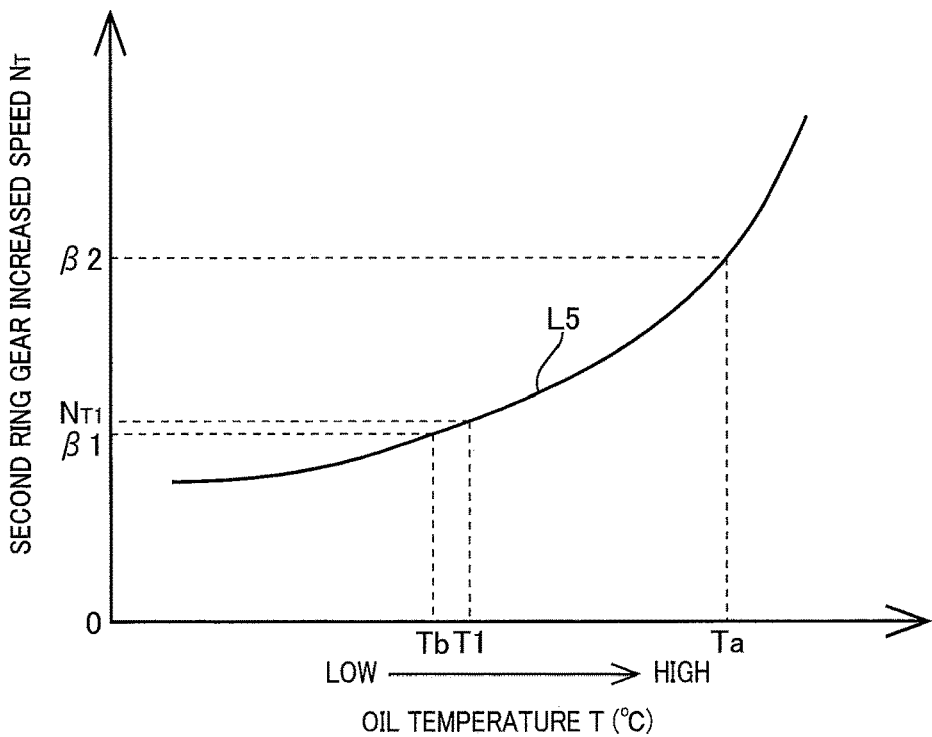
FIG. 19 is a diagram showing the fourth example of the present invention and is a diagram showing the first map preliminarily stored in the current command value storage portion of the electronic control device.
Figure 20:
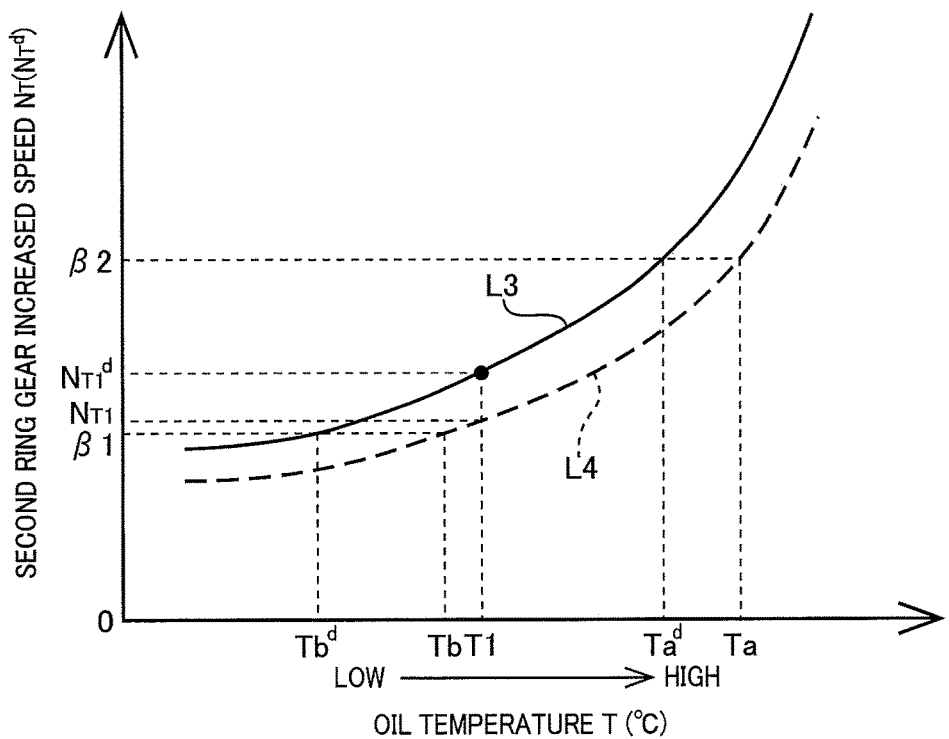
FIG. 20 is a diagram showing the fourth example of the present invention and is a diagram showing the first map of FIG. 19 updated by the updating portion of the electronic control device.

A four-wheel drive vehicle of this example is substantially the same as the four-wheel drive vehicle 10 of the first example described above except that the second map of FIG. 6 preliminarily stored in the current command value storage portion 162 is changed as shown in FIG. 18. A first map shown in FIG. 19 is the same as the first map of FIG. 5 of the first example, and a first map shown in FIG. 20 is the same as the first map of FIG. 9 of the first example. As with the first example, the four-wheel drive vehicle of this example provides the effect of maintaining the increase rate $N_T^d$ of the second ring gear 94 at the target increase rate Nuptg when the second dog clutch 38 of the second connecting/disconnecting device 36 is engaged.

In the second map of FIG. 18 preliminarily stored in the current command value storage portion 162, when the oil temperature T (° C.) of the oil becomes higher, the current command value $I_T$ (A) is reduced in, for example, three stages, depending on the oil temperature T (° C.). Three current command values, i.e., a first current command value I1 (A), a second current command value I2 (A), and a third current command value I3 (A), set in advance shown in the second map of FIG. 18 have a relationship of I1<I2<I3. In the second map of FIG. 18, if the oil temperature T (° C.) of the oil is higher than a second oil temperature Ta (° C.), the first current command value I1 (A) is calculated. In the second map of FIG. 18, if the oil temperature T (° C.) of the oil is equal to or lower than the second oil temperature Ta (° C.) and equal to or higher than a first oil temperature Tb (° C.), the second current command value I2 (A) is calculated. In the second map of FIG. 18, if the oil temperature T (° C.) of the oil is lower than the first oil temperature Tb (° C.), the third current command value I3 (A) is calculated. The first oil temperature Tb (° C.) is the oil temperature T (° C.) when the increase rate $N_T$ of the second ring gear 94 is a first increase rate β1 set in advance, as shown in the first map of FIG. 19. The second oil temperature Ta (° C.) is the oil temperature T (° C.) when the increase rate $N_T$ of the second ring gear 94 is a second increase rate β2 set in advance. As shown in the first map of FIG. 19, the second oil temperature Ta (° C.) is higher than the first oil temperature Tb (° C.), and the second increase rate β2 is faster than the first increase rate β1.

When the oil temperature T1 (° C.) and the increase rate $N_{T1}^d$ of the second ring gear 94 are measured by the learning value acquiring portion 168b, and the broken line L4 is updated to the solid line L3 as shown in the first map of FIG. 20, the updating portion 162a updates, based on the update, the first oil temperature Tb (° C.) to a first oil temperature $Tb^d$ (° C.) and the second oil temperature Ta (° C.) to a second oil temperature $Ta^d$ (° C.). As shown in the first map of FIG. 20, the first oil temperature $Tb^d$ (° C.) is the oil temperature T (° C.) when the updated increase rate $N_T^d$ of the second ring gear 94 is the first increase rate β1. As shown in the first map of FIG. 20, the second oil temperature $Ta^d$ (° C.) is the oil temperature T (° C.) when the updated increase rate $N_T^d$ of the second ring gear 94 is the second increase rate β2.

Figure 21:
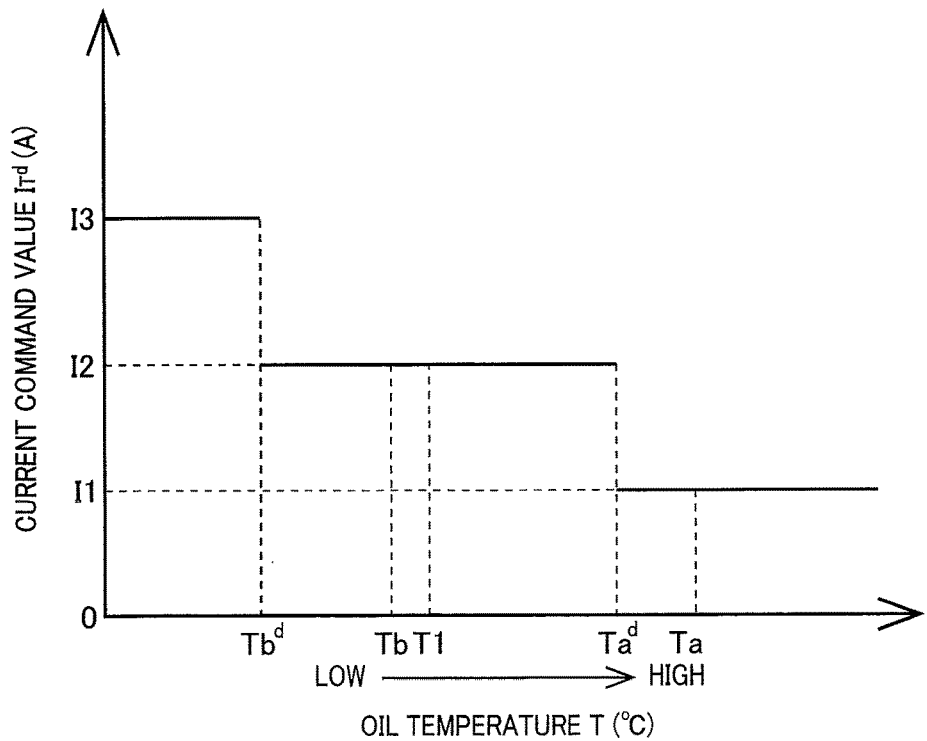
FIG. 21 is a diagram showing the fourth example of the present invention and is a diagram showing the second map of FIG. 18 updated by the updating portion of the electronic control device.

When the first map is updated as shown in FIG. 20, the updating portion 162a updates the second map of FIG. 18 to the second map of FIG. 21 based on the first oil temperature $Tb^d$ (° C.) and the second oil temperature $Ta^d$ (° C.) updated in the first map of FIG. 20. For example, in the updated second map of FIG. 21, if the oil temperature T (° C.) of the oil is higher than the second oil temperature $Ta^d$ (° C.), the first current command value I1 (A) is calculated. In the second map of FIG. 21, if the oil temperature T (° C.) of the oil is equal to or lower than the second oil temperature $Ta^d$ (° C.) and equal to or higher than the first oil temperature $Tb^d$ (° C.), the second current command value I2 (A) is calculated. In the second map of FIG. 21, if the oil temperature T (° C.) of the oil is lower than the first oil temperature $Tb^d$ (° C.), the third current command value I3 (A) is calculated. Therefore, in the updated second map shown in FIG. 21, if the increase rate $N_T^d$ of the second ring gear 94 is faster than the second increase rate β2, the first current command value I1 (A) is calculated. In the second map shown in FIG. 21, if the increase rate $N_T^d$ of the second ring gear 94 is equal to or lower than the second increase rate β2 and equal to or higher than the first increase rate β1, the second current command value I2 (A) is calculated. In the second map shown in FIG. 21, if the increase rate $N_T^d$ of the second ring gear 94 is slower than the first increase rate β1, the third current command value I3 (A) is calculated.

Fifth Example

Figures 22, 23:
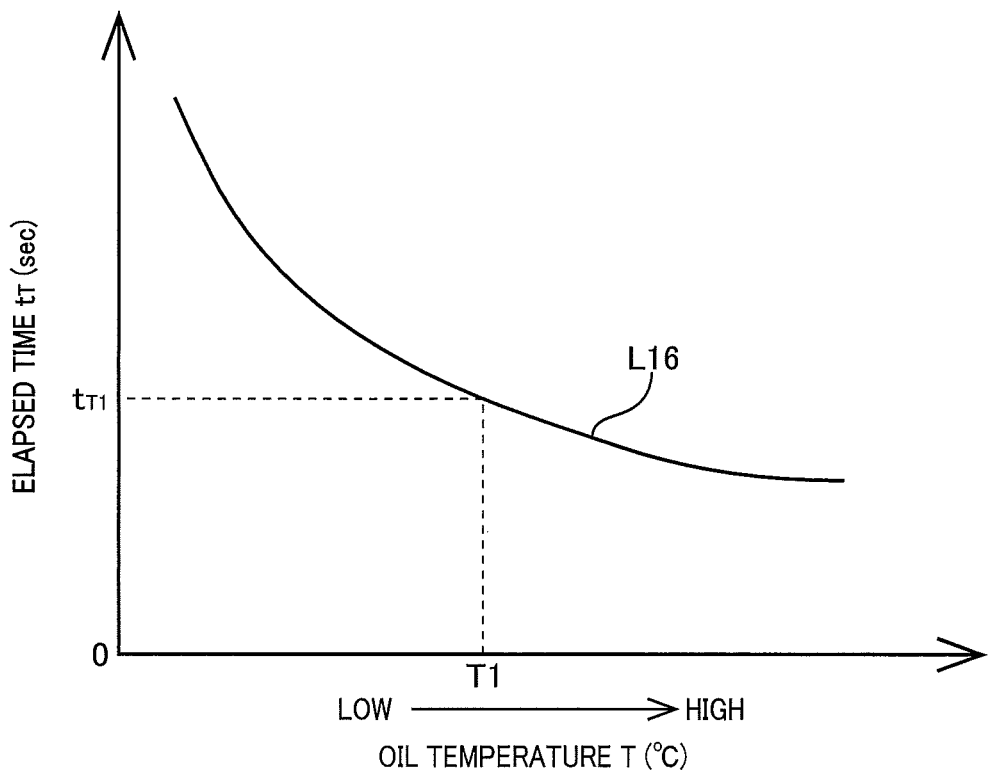
FIG. 22 is a diagram showing another example, i.e., a fifth example, of the present invention and is a diagram showing the first map preliminarily stored in the current command value storage portion of the electronic control device.
FIG. 23 is a diagram showing the fifth example of the present invention and is a diagram showing the third map preliminarily stored in the current command value storage portion of the electronic control device.
Figure 24:
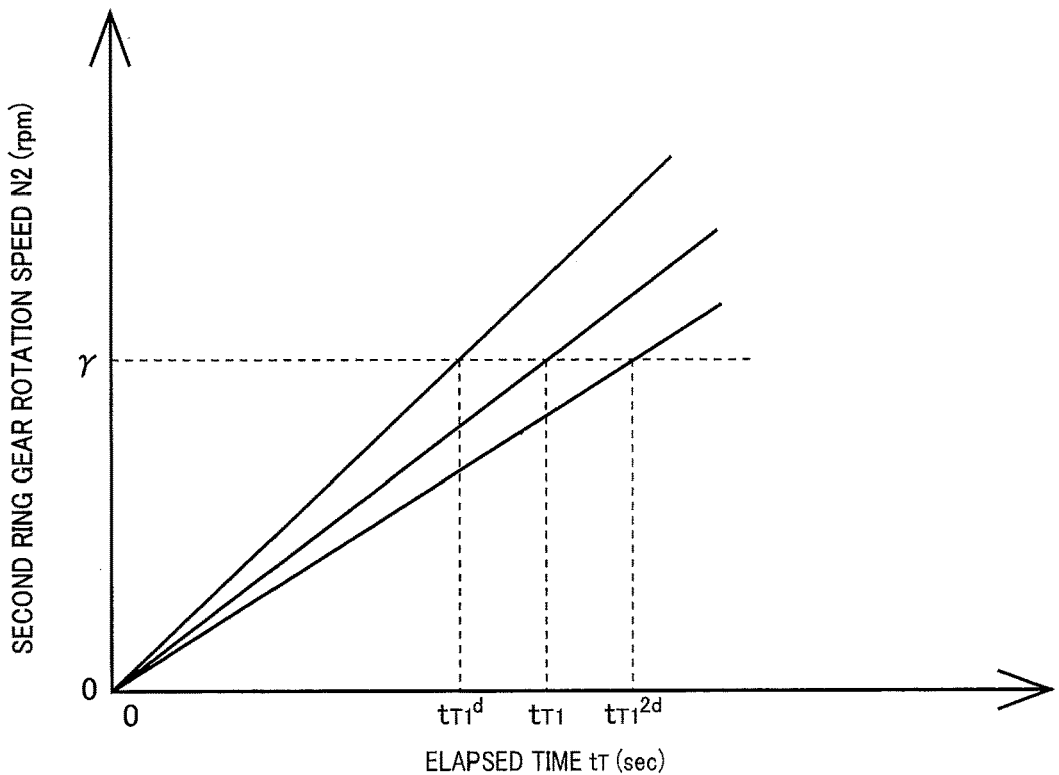
FIG. 24 is a diagram for explaining an elapsed time shown in the first map of FIG. 22.

A four-wheel drive vehicle of this example is substantially the same as the four-wheel drive vehicle 10 of the first example described above except that the learning value acquiring portion 168b measures an elapsed time $t_T$ (sec) elapsing until the rotation speed N2 (rpm) of the second ring gear 94 increases to a predetermined speed γ (rpm) set in advance, that based on the measured elapsed time $t_T$ (sec), the updating portion 162a updates the current command value $I_T$ (A) stored in the current command value storage portion 162 to make the increase rate $N_T$ of the rotation speed N2 of the second ring gear 94 equal to the target increase rate Nuptg, etc. The current command value storage portion 162 stores a first map of FIG. 22 instead of the first map of FIG. 5. The current command value storage portion 162 stores a third map of FIG. 23 instead of the third map of FIG. 7. For example, the first map of FIG. 22 is a map showing the elapsed time $t_T$ (sec) when the second electromagnetic coil 112 of the second electromagnetic actuator 110 is subjected to the energization control with the predetermined current command value $I_{Tc1}$ (A) set in advance regardless of the oil temperature T (° C.) of the oil. As shown in FIG. 24, the elapsed time $t_T$ (sec) is an elapsed time elapsing from when the energization control is started until the rotation speed N2 of the second ring gear 94 increases to the predetermined speed γ (rpm). For example, the third map of FIG. 23 is a map showing the elapsed time $t_T$ (sec) in the first map of FIG. 22 corresponding to the oil temperature T (° C.) of the oil for every 10° C. and the current command value $I_T$ (A) in the second map of FIG. 6. As with the first example, the four-wheel drive vehicle of this example provides the effect of maintaining the increase rate $N_T^d$ of the second ring gear 94 at the target increase rate Nuptg when the second dog clutch 38 of the second connecting/disconnecting device 36 is engaged.

For example, if the oil temperature T (° C.) of the oil measured by the learning value acquiring portion 168b is the oil temperature T1 (° C.) and the elapsed time $t_T$ (sec) measured by the learning value acquiring portion 168b is an elapsed time $t_{T1}^d$ (sec), the updating portion 162a uses, for example, Eq. (9), to update the current command value $I_{T1}$ (A) corresponding to the oil temperature T1 (° C.) to the current command value $I_{T1}^d$ (A), $$I_{T1}^d = I_{T1} \times Rdw \quad (9)$$

$$Rdw = t_{T1}^d / t_{T1} \quad (10)$$

"Rdw" shown in Eq. (9) is a decrease rate of the elapsed time $t_{T1}$ (sec) corresponding to the oil temperature T1 (° C.) measured by the learning value acquiring portion 168b and is obtained by Eq. (10).

Figure 25:
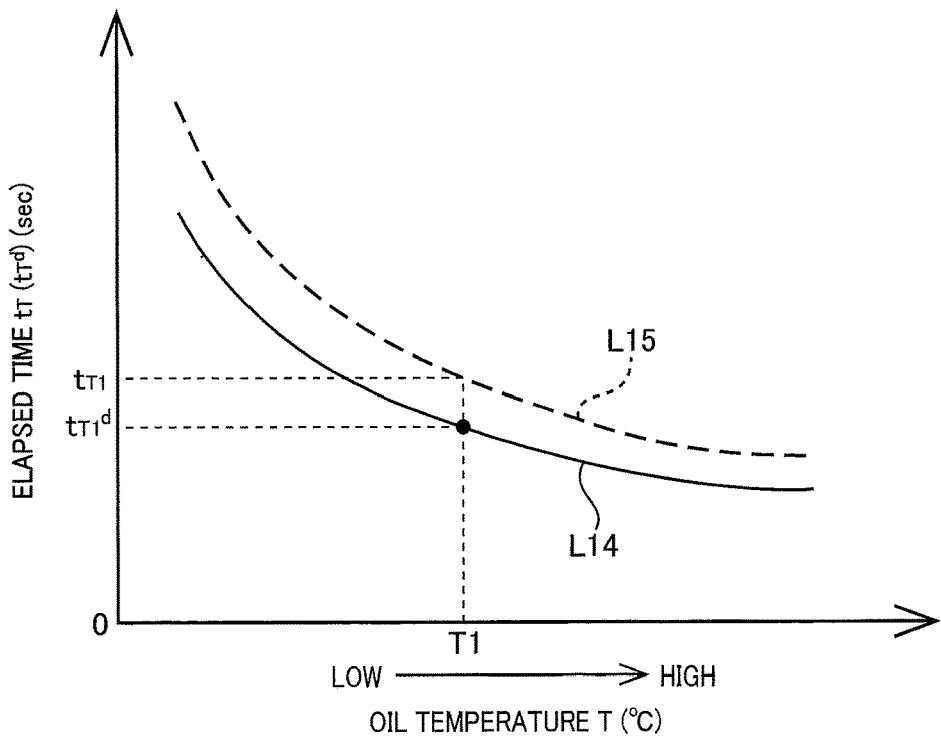
FIG. 25 is a diagram showing the fifth example of the present invention and is a diagram showing the first map of FIG. 22 updated by the updating portion of the electronic control device.

When the decrease rate Rdw is calculated with Eq. (10), the updating portion 162a uses Eq. (11) to estimate an elapsed time $t_T^d$ (sec) corresponding to the oil temperature T (° C.) other than the oil temperature T1 (° C.) as indicated by a solid line L14 of a first map of FIG. 25. A broken line L15 shown in the first map of FIG. 25 is a line virtually representing a solid line L16 shown in the first map of FIG. 22. When the elapsed time $t_T^d$ (sec) is estimated as indicated by the solid line L14, the updating portion 162a updates the elapsed time $t_T$ of the broken line L15 preliminarily stored in the first map of FIG. 25 to the estimated elapsed time $t_T^d$ (sec) of the solid line L14 and stores the updated first map shown in FIG. 25 in the current command value storage portion 162.

$$t_T^d = t_T \times Rdw \quad (11)$$

When the decrease rate Rdw is calculated with Eq. (10), the updating portion 162a uses Eq. (12) to estimate the current command value $I_T^d$ (A) corresponding to the oil temperature T (° C.) other than the oil temperature T1 (° C.) in the second map of FIG. 10.

$$I_T^d = I_T \times Rdw \quad (12)$$

Figures 26, 27:
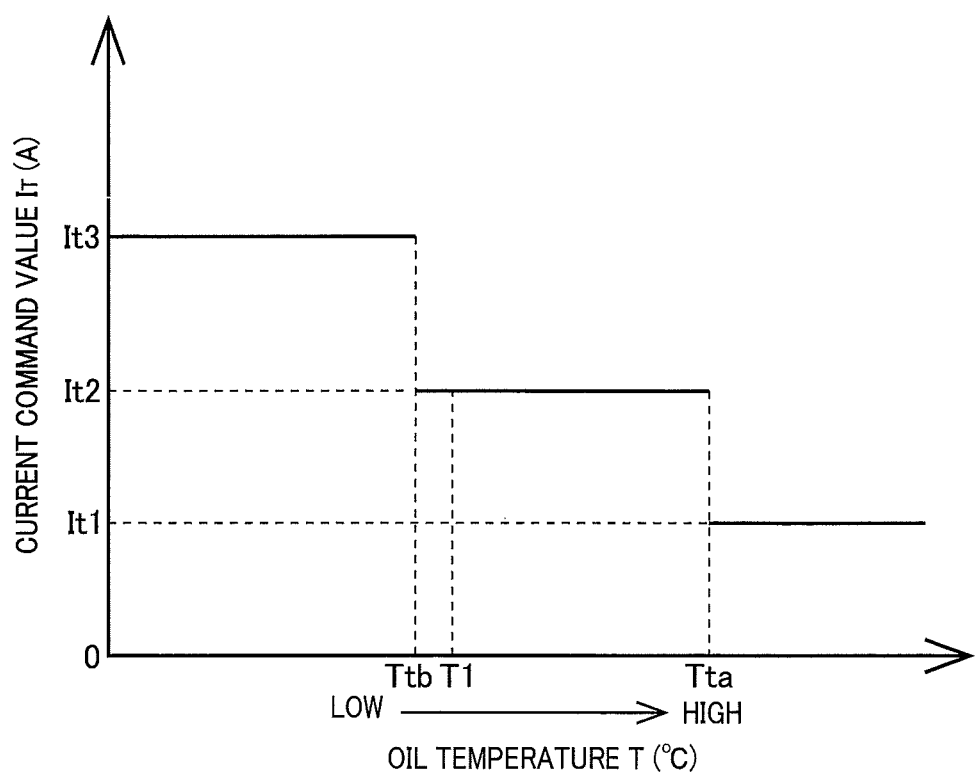
FIG. 26 is a diagram showing the fifth example of the present invention and is a diagram showing the third map of FIG. 23 updated by the updating portion of the electronic control device.
FIG. 27 is a diagram showing another example, i.e., an eighth example, of the present invention and is a diagram showing the second map preliminarily stored in the current command value storage portion of the electronic control device.

After the updating portion 162a updates the first map of FIG. 22 to the first map of FIG. 25 and the second map of FIG. 6 to the second map of FIG. 10, then, the updating portion 162a updates the third map of FIG. 26 based on the elapsed time $t_T^d$ (sec) of the updated first map shown in FIG. 25 and the current command value $I_T^d$ (A) of the updated second map shown in FIG. 10.

As described above, according to the four-wheel drive vehicle of this example, the elapsed time $t_T$ is the time elapsing from when the energization control is started until the rotation speed N2 of the second ring gear 94 increases to the predetermined speed γ (rpm) set in advance at the time of engagement of the second dog clutch 38 of the second connecting/disconnecting device 36. Therefore, when the second dog clutch 38 of the second connecting/disconnecting device 36 is engaged, the elapsed time $t_T$ (sec) can suitably be learned.

Sixth Example

A four-wheel drive vehicle of this example is substantially the same as the four-wheel drive vehicle of the second example described above except that the learning value acquiring portion 168b measures the elapsed time $t_T$ (sec), that based on the measured elapsed time $t_T$ (sec), the updating portion 162a updates the current command value $I_T$ (A) stored in the current command value storage portion 162 to make the increase rate $N_T$ equal to the target increase rate Nuptg, etc. As with the second example, the four-wheel drive vehicle of this example provides the effect of maintaining the increase rate $N_T^d$ of the second ring gear 94 at the target increase rate Nuptg when the second dog clutch 38 of the second connecting/disconnecting device 36 is engaged.

The updating portion 162a estimates the elapsed time $t_T^d$ (sec) corresponding to the oil temperature T (° C.) other than the oil temperature T1 (° C.) in the first map by using Eq. (13).

$$t_T^d = t_T \times RdW \times b \quad (13)$$

The updating portion 162a estimates the current command value $I_T^d$ (A) corresponding to the oil temperature T (° C.) other than the oil temperature T1 (° C.) in the second map by using Eq. (14).

$$I^{TD} = I_T \times Rdw \times b \quad (14)$$

Seventh Example

A four-wheel drive vehicle of this example is substantially the same as the four-wheel drive vehicle of the third example described above except that the learning value acquiring portion 168b measures the elapsed time $t_T$ (sec), that based on the measured elapsed time $t_T$ (sec), the updating portion 162a updates the current command value $I_T$ (A) stored in the current command value storage portion 162 to make the increase rate $N_T$ equal to the target increase rate Nuptg, etc. As with the third example, the four-wheel drive vehicle of this example provides the effect of maintaining the increase rate $N_T^d$ of the second ring gear 94 at the target increase rate Nuptg when the second dog clutch 38 of the second connecting/disconnecting device 36 is engaged.

The updating portion 162a estimates the elapsed time $t_T^d$ (rpm) corresponding to the oil temperature T (° C.) other than the oil temperature T1 (° C.) in the first map by using Eq. (15).

$$t_T^d = t_T + (t_{T1}^d - t_{T1}) \quad (15)$$

The updating portion 162a estimates the current command value $I_T^d$ (A) corresponding to the oil temperature T (° C.) other than the oil temperature T1 (° C.) in the second map by using Eq. (16).

$$I_T^d = I_T + e(t_{T1}^d - t_{T1}) \quad (16)$$

Eighth Example

Figure 28:
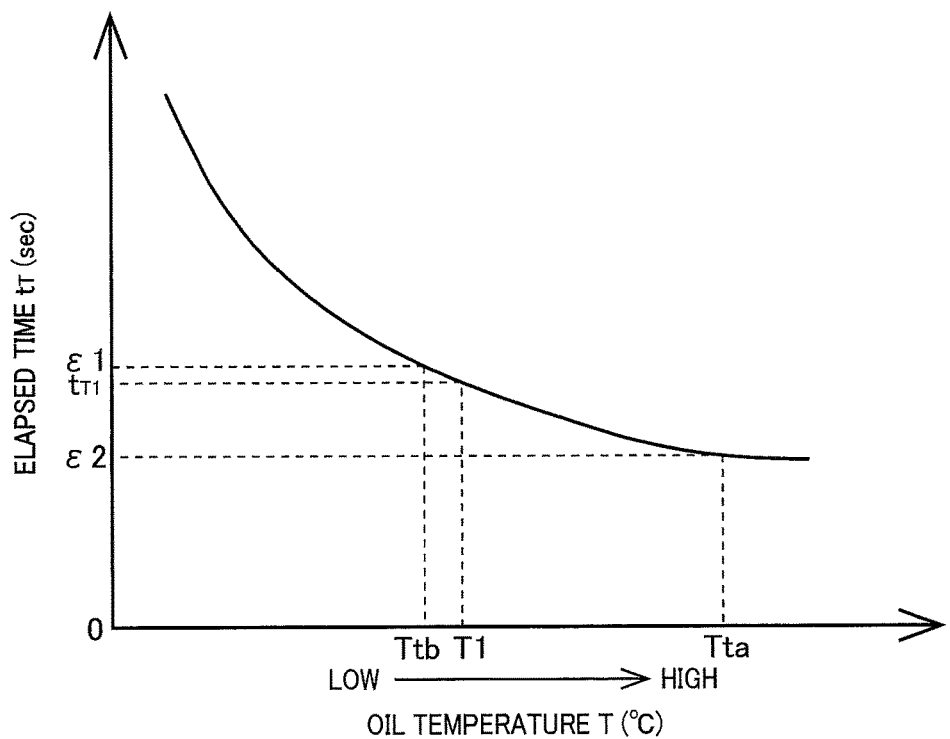
FIG. 28 is a diagram showing the eighth example of the present invention and is a diagram showing the first map preliminarily stored in the current command value storage portion of the electronic control device.
Figure 29:
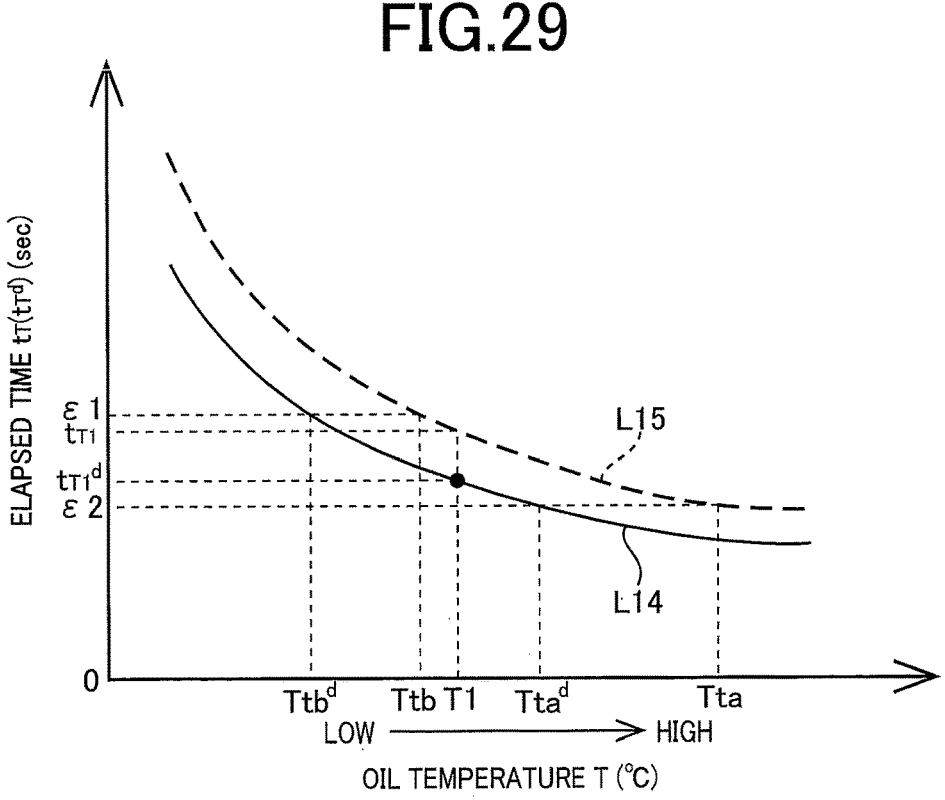
FIG. 29 is a diagram showing the eighth example of the present invention and is a diagram showing the first map of FIG. 28 updated by the updating portion of the electronic control device.

A four-wheel drive vehicle of this example is substantially the same as the four-wheel drive vehicle 10 of the first example described above except that the second map of FIG. 6 preliminarily stored in the current command value storage portion 162 is changed to a second map of FIG. 27, that the learning value acquiring portion 168b measures the elapsed time $t_T$ (sec), and that the updating portion 162a updates the second map of FIG. 27 based on the measured elapsed time $t_T$ (sec). A first map shown in FIG. 28 is the same as the first map of FIG. 22 of the fifth example, and a first map shown in FIG. 29 is the same as the first map of FIG. 25 of the fifth example. As with the first example, the four-wheel drive vehicle of this example provides the effect of maintaining the increase rate $N_T^d$ of the second ring gear 94 at the target increase rate Nuptg when the second dog clutch 38 of the second connecting/disconnecting device 36 is engaged.

In the second map of FIG. 27 preliminarily stored in the current command value storage portion 162, when the oil temperature T (° C.) of oil becomes higher, the current command value $I_T$ (A) is reduced in, for example, three stages, depending on the oil temperature T (° C.). Three current command values, i.e., a first current command value It1 (A), a second current command value It2 (A), and a third current command value It3 (A), set in advance shown in the second map of FIG. 27 have a relationship of It1<It2<It3. In the second map of FIG. 27, if the oil temperature T (° C.) of the oil is higher than a second oil temperature Tta (° C.), the first current command value It1 (A) is calculated. In the second map of FIG. 27, if the oil temperature T (° C.) of the oil is equal to or lower than the second oil temperature Tta (° C.) and equal to or higher than a first oil temperature Ttb (° C.), the second current command value It2 (A) is calculated. In the second map of FIG. 27, if the oil temperature T (° C.) of the oil is lower than the first oil temperature Ttb (° C.), the third current command value It3 (A) is calculated. The first oil temperature Ttb (° C.) is the oil temperature T (° C.) when the elapsed time $t_T$ (sec) is a preset first elapsed time ε1 (*sec*) as shown in the first map of FIG. 28. The second oil temperature Tta (° C.) is the oil temperature T (° C.) when the elapsed time $t_T$ (sec) is a preset second elapsed time ε2 (*sec*) as shown in the first map of FIG. 28.

When the oil temperature T1 (° C.) and the elapsed time $t_{T1}^d$ (sec) are measured by the learning value acquiring portion 168b and the broken line L15 is updated to the solid line L14 as shown in the first map of FIG. 29, the updating portion 162a updates, based on the update, the first oil temperature Ttb (° C.) to a first oil temperature $Ttb^d$ (° C.) and the second oil temperature Tta (° C.) to a second oil temperature $Tta^d$ (° C.). As shown in the first map of FIG. 29, the first oil temperature $Ttb^d$ (° C.) is the oil temperature T (° C.) when the updated elapsed time $t_T^d$ is the first elapsed time ε1 (*sec*). The second oil temperature $Tta^d$ (° C.) is the oil temperature T (° C.) when the updated elapsed time $t_T^d$ (sec) is the second elapsed time ε2 (*sec*).

Figure 30:
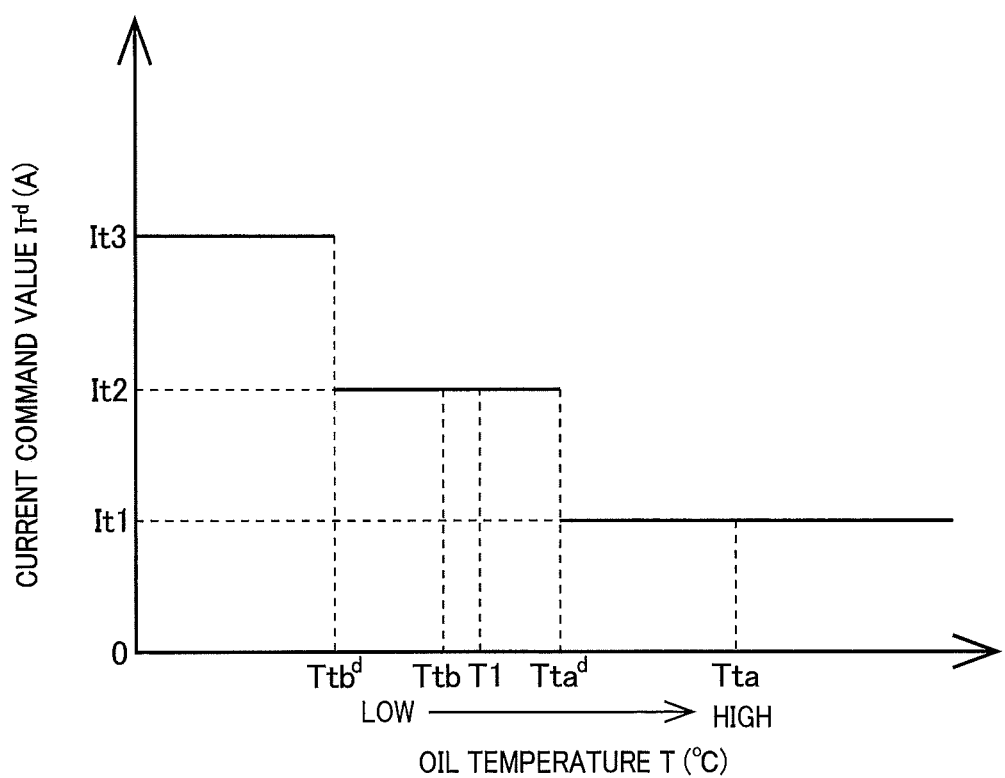
FIG. 30 is a diagram showing the fifth example of the present invention and is a diagram showing the second map of FIG. 27 updated by the updating portion of the electronic control device.

When the first map is updated as shown in FIG. 29, the updating portion 162a updates the second map as shown in FIG. 30 based on the first oil temperature $Ttb^d$ (° C.) and the second oil temperature $Tta^d$ (° C.) updated in the first map of FIG. 29. For example, in the updated second map of FIG. 30, if the oil temperature T (° C.) of the oil is higher than the second oil temperature $Tta^d$ (° C.), the first current command value It1 (A) is calculated. In the second map of FIG. 30, if the oil temperature T (° C.) of the oil is equal to or lower than the second oil temperature $Tta^d$ (° C.) and equal to or higher than the first oil temperature $Ttb^d$ (° C.), the second current command value It2 (A) is calculated. In the second map of FIG. 30, if the oil temperature T (° C.) of the oil is lower than the first oil temperature $Ttb^d$ (° C.), the third current command value It3 (A) is calculated. Therefore, in the updated second map shown in FIG. 30, if the elapsed time $t_T^d$ is shorter than the second elapsed time ε2, the first current command value It1 (A) is calculated. In the second map of FIG. 30, if the elapsed time $t_T^d$ is equal to or longer than the second elapsed time ε2 and equal to or shorter than the first elapsed time ε1, the second current command value It2 (A) is calculated. In the second map of FIG. 30, when the elapsed time $t_T^d$ is longer than the first elapsed time ε1, the third current command value It3 (A) is calculated.

Ninth Example

Figure 31:
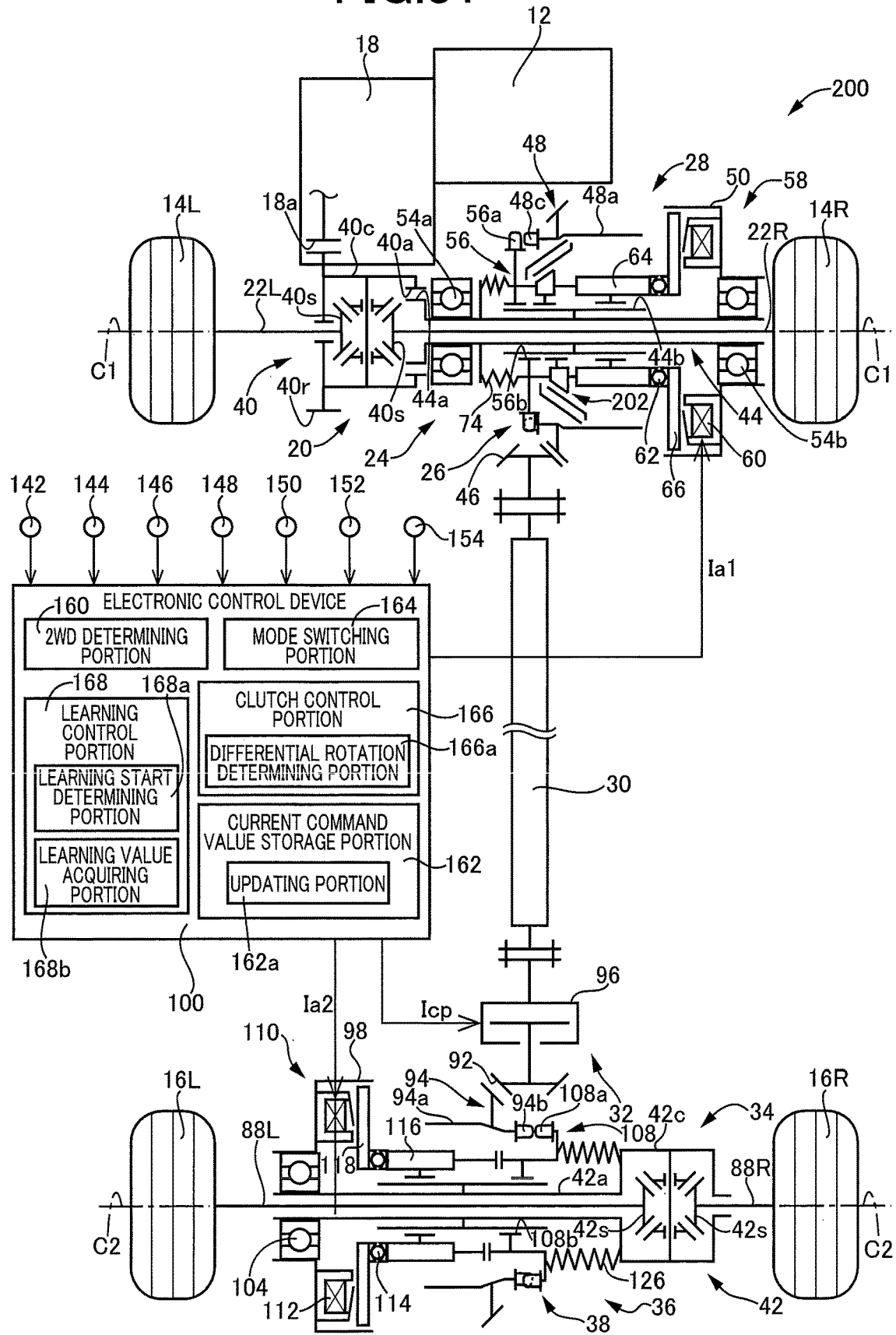
FIG. 31 is a diagram showing another example, i.e., a ninth example, of the present invention and is a diagram for explaining a configuration of the four-wheel drive vehicle.

A four-wheel drive vehicle 200 of this example shown in FIG. 31 is substantially the same as the four-wheel drive vehicle 10 of the first example described above except the following three points. The first point is that the first connecting/disconnecting device 24 includes a synchronization mechanism 202 synchronizing the rotation speed N1 of the first ring gear (first rotating member) 48 with the rotation speed Nk1 (*rpm*) of the input shaft (second rotating member) 44. The second point is that the synchronization mechanism 138 is removed from the second connecting/disconnecting device 36. The third point is that when the first dog clutch 26 of the first connecting/disconnecting device 24 is engaged, the electronic control device 100 learns an increase rate $N1_T^d$ of the rotation speed N1 of the first ring gear 48 with respect to a current command value $I1_T$ and updates the current command value $I1_T$ to a current command value $I1_T^d$ to make the increase rate $N1_T^d$ of the rotation speed N1 of the first ring gear 48 equal to a target increase rate (predetermined rate) N1uptg set in advance based on the learned increase rate $N1_T^d$. Hereinafter, the increase rate $N1_T^d$ of the rotation speed N1 is just referred to as "increase rate $N1_T^d$". The current command value $I1_T$ is a command value for providing the energization control of the first electromagnetic coil 60 of the first electromagnetic actuator 58, and the ACT1 command current Ia1 (A) is supplied to the first electromagnetic coil 60 based on the current command value $I1_T$. The target increase rate N1uptg is an ideal increase rate $N1_T$ of the first ring gear 48 set in advance so as to suitably reduce a sound generated from the first dog clutch 26 and suitably shorten a switching time required until the first dog clutch 26 is switched from the released state to the engaged state during provision of the energization control based on the current command value $I1_T$. The four-wheel drive vehicle 200 of this example provides the effect of maintaining the increase rate $N1_T^d$ of the first ring gear 48 at the target increase rate N1uptg when the first dog clutch 26 of the first connecting/disconnecting device 24 is engaged.

In the four-wheel drive vehicle 200, as shown in FIG. 31, when the four-wheel drive mode is selected by the electronic control device 100, for example, the first dog clutch 26 is commanded to switch from the released state to the engaged state, and once the first dog clutch 26 is switched from the released state to the engaged state, the control coupling 96 is engaged, and the second dog clutch 38 is subsequently switched from the released state to the engaged state.

Tenth Example

Figure 32:
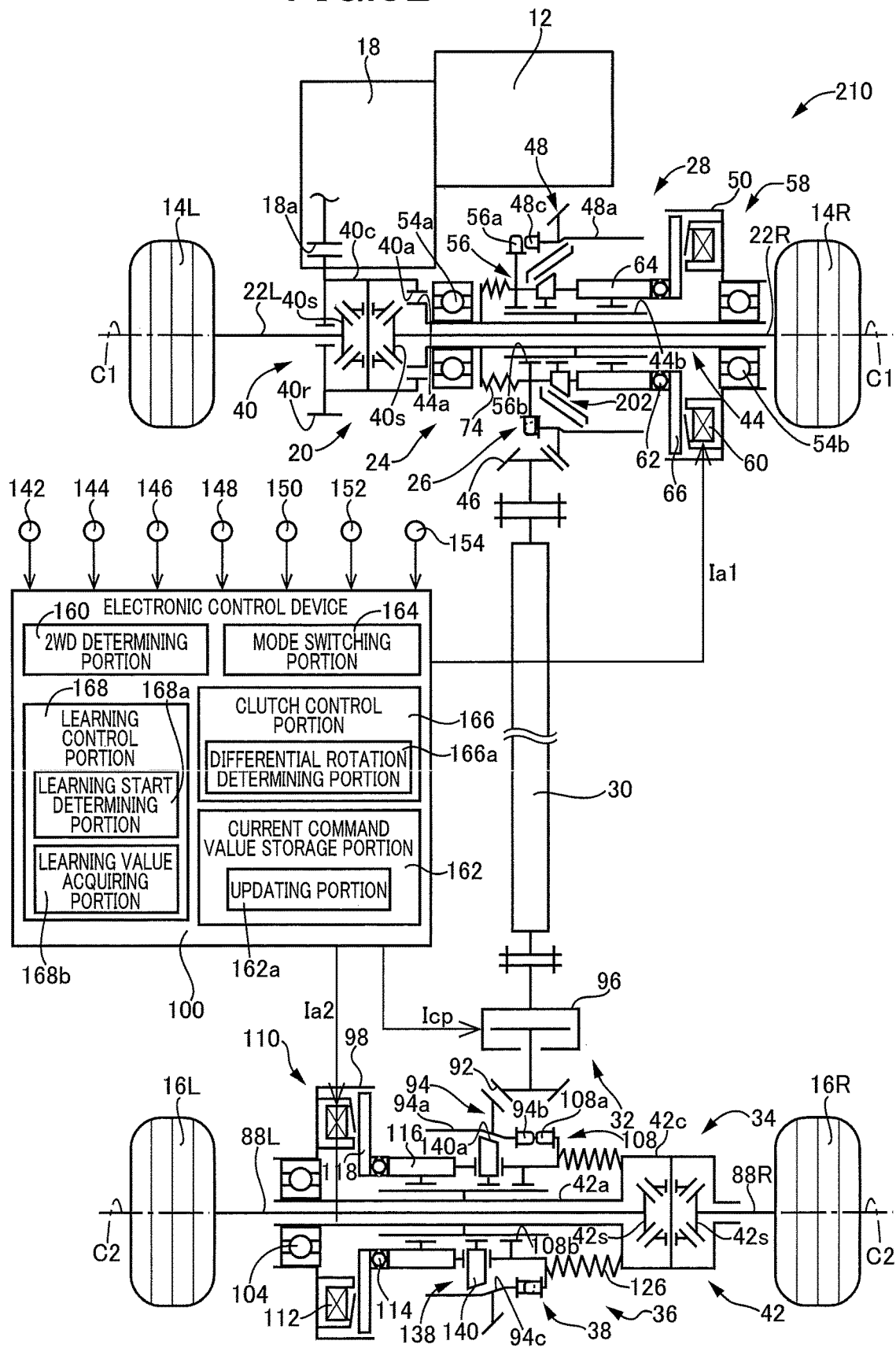
FIG. 32 is a diagram showing another example, i.e., a tenth example, of the present invention and is a diagram for explaining a configuration of the four-wheel drive vehicle.

A four-wheel drive vehicle 210 of this example shown in FIG. 32 is substantially the same as the four-wheel drive vehicle 10 of the first example described above except the following two points. The first point is that the first connecting/disconnecting device 24 includes the above-described synchronization mechanism 202. The second point is that when the first dog clutch 26 of the first connecting/disconnecting device 24 is engaged, the electronic control device 100 learns the increase rate $N1_T^d$ of the first ring gear 48 with respect to the current command value $I1_T$ and updates the current command value $I1_T$ to the current command value $I1_T^d$ to make the increase rate $N1_T^d$ of the first ring gear 48 equal to the target increase rate N1uptg based on the learned increase rate $N1_T^d$. The four-wheel drive vehicle 210 of this example provides the effect of maintaining the increase rate $N_T^d$ of the second ring gear 94 at the target increase rate Nuptg when the second dog clutch 38 of the second connecting/disconnecting device 36 is engaged and the effect of maintaining the increase rate $N1_T^d$ of the first ring gear 48 at the target increase rate N1uptg when the first dog clutch 26 of the first connecting/disconnecting device 24 is engaged.

In the four-wheel drive vehicle 210, the engagement of the first dog clutch 26 of the first connecting/disconnecting device 24 and the engagement of the second dog clutch 38 of the second connecting/disconnecting device 36 are alternately achieved during two-wheel drive running, and the current command values $I1_T$, $I_T$ are updated to the current command values $I1_T^d$, $I_T^d$ based on the increase rates $N1_T^d$, $N_T^d$ learned when the first dog clutch 26 and the second dog clutch 38 are engaged.

Although the examples of the present invention have been described in detail with reference to the drawings, the present invention is also applicable in other forms.

For example, the learning value acquiring portion 168b measures the increase rate $N_T$ of the second ring gear 94 or the elapsed time $t_T$ (sec) elapsing until the rotation speed N2 of the second ring gear 94 increases to the predetermined speed γ (rpm) as the characteristic value indicative of the increasing characteristic of the rotation speed N2 of the second ring gear 94. Instead, the characteristic value indicative of the increasing characteristic of the rotation speed N2 of the second ring gear 94 other than the increase rate $N_T$ and the elapsed time $t_T$ (sec) may be measured.

Although the power transmission path 32 includes the control coupling 96 in the four-wheel drive vehicle 10 of the first example described above, the power transmission path 32 may not necessarily include the control coupling 96.

In the example as shown in FIG. 18, for example, the current command value storage portion 162 stores the second map having the current command value $I_T$ reduced in three stages depending on the oil temperature T (° C.), for example, as shown in FIG. 18. Instead, the portion 162 may store the second map having the current command value $I_T$ reduced in more than three stages, for example, four or more stages, depending on the oil temperature T (° C.).

The above description is merely an embodiment and the present invention can be implemented in variously modified and improved forms based on the knowledge of those skilled in the art.

REFERENCE SIGNS LIST 10, 200, 210: four-wheel drive vehicle
12: engine (drive power source)
14L, 14R: front wheel (main drive wheel)
16L, 16R: rear wheel (sub-drive wheel)
24: first connecting/disconnecting device (connecting/disconnecting device)
26: first dog clutch (dog clutch)
32: power transmission path
36: second connecting/disconnecting device (connecting/disconnecting device)
38: second dog clutch (dog clutch)
44: input shaft (second rotating member)
48: first ring gear (first rotating member)
50: first casing (casing)
58: first electromagnetic actuator (electromagnetic actuator)
60: first electromagnetic coil (electromagnetic coil)
90: cylinder member (second rotating member)
94: second ring gear (first rotating member)
96: control coupling
98: second casing (casing)
100: electronic control device (control device)
110: second electromagnetic actuator (electromagnetic actuator)
112: second electromagnetic coil (electromagnetic coil)
138, 202: synchronization mechanism
162: current command value storage portion
162a: updating portion
166: clutch control portion
168a: learning start determining portion
168b: learning value acquiring portion
$I1_T$, $I_T$: current command value N1: rotation speed of a first ring gear 48
N2: rotation speed of a second ring gear 94
Nk1: rotation speed of an input shaft 44
Nk2: rotation speed of a cylinder member 90
$N_T^d$, $N1_T^d$: increase rate (characteristic value)
Nuptg, N1uptg: target increase rate (predetermined rate)
T: oil temperature
$t_T$: elapsed time (characteristic value)
α: predetermined time period
γ: predetermined speed

What is claimed is:

1. A four-wheel drive vehicle comprising: main drive wheels to which a drive power from a drive power source is transmitted; sub-drive wheels to which a portion of the drive power from the drive power source is transmitted during four-wheel drive running; a power transmission path transmitting the drive power from the drive power source to the sub-drive wheels; a first connecting/disconnecting device selectively disconnecting or connecting between the power transmission path and the drive power source; and a second connecting/disconnecting device selectively disconnecting or connecting between the power transmission path and the sub-drive wheels, at least one connecting/disconnecting device of the first and second connecting/disconnecting devices including: a dog clutch engaging a first rotating member disposed in the power transmission path and a second rotating member connected to the drive power source or the sub-drive wheels in a power transmittable manner; a synchronization mechanism synchronizing a rotation speed of the first rotating member with a rotation speed of the second rotating member; and an electromagnetic actuator including an electromagnetic coil to generate a torque for causing the synchronization mechanism to increase the rotation speed of the first rotating member and to cause the dog clutch to engage when the electromagnetic coil is subjected to energization control, wherein
the four-wheel drive vehicle includes a control device providing the energization control of the electromagnetic coil based on a preliminarily stored current command value to engage the dog clutch of the one connecting/disconnecting device, and wherein
the control device learns a characteristic value indicative of an increasing characteristic of the rotation speed of the first rotating member with respect to the current command value and updates the current command value such that an increase rate of the rotation speed of the first rotating member becomes equal to a predetermined rate based on the learned characteristic value.

2. The four-wheel drive vehicle according to claim 1, wherein
the power transmission path includes a control coupling controlling a transmission torque transmitted from the drive power source to the sub-drive wheels during four-wheel drive running, and wherein
the control device learns the characteristic value while the power transmission path and the drive power source or the sub-drive wheels are disconnected by the other connecting/disconnecting device of the first and second connecting/disconnecting devices and the control coupling is released.

3. The four-wheel drive vehicle according to claim 2, wherein
the characteristic value is the increase rate of the rotation speed of the first rotating member increased at the time of engagement of the dog clutch of the one connecting/disconnecting device from when the energization control is started until when a predetermined time period set in advance has elapsed.

4. The four-wheel drive vehicle according to claim 2, wherein
the characteristic value is an elapsed time at the time of engagement of the dog clutch of the one connecting/disconnecting device from when the energization control is started until when the rotation speed of the first rotating member increases to a predetermined speed set in advance.

5. The four-wheel drive vehicle according to claim 2, wherein
the first rotating member is rotatably disposed in a casing housing the one connecting/disconnecting device to stir an oil stored in the casing, wherein
the control device stores a plurality of values corresponding to oil temperatures of the oil as the current command value, and wherein
the control device provides the energization control of the electromagnetic coil based on the current command value corresponding to the oil temperature of the oil to engage the dog clutch of the one connecting/disconnecting device and updates the current command value corresponding to the oil temperature of the oil at the time of learning of the characteristic value.

6. The four-wheel drive vehicle according to claim 5, wherein
the characteristic value is the increase rate of the rotation speed of the first rotating member increased at the time of engagement of the dog clutch of the one connecting/disconnecting device from when the energization control is started until when a predetermined time period set in advance has elapsed.

7. The four-wheel drive vehicle according to claim 5, wherein
the characteristic value is an elapsed time at the time of engagement of the dog clutch of the one connecting/disconnecting device from when the energization control is started until when the rotation speed of the first rotating member increases to a predetermined speed set in advance.

8. The four-wheel drive vehicle according to claim 5, wherein the control device updates each of the plurality of the current command values corresponding to the oil temperatures of the oil based on the learned characteristic value.

9. The four-wheel drive vehicle according to claim 8, wherein
the characteristic value is the increase rate of the rotation speed of the first rotating member increased at the time of engagement of the dog clutch of the one connecting/disconnecting device from when the energization control is started until when a predetermined time period set in advance has elapsed.

10. The four-wheel drive vehicle according to claim 8, wherein
the characteristic value is an elapsed time at the time of engagement of the dog clutch of the one connecting/disconnecting device from when the energization control is started until when the rotation speed of the first rotating member increases to a predetermined speed set in advance.

11. The four-wheel drive vehicle according to claim 1, wherein
the first rotating member is rotatably disposed in a casing housing the one connecting/disconnecting device to stir an oil stored in the casing, wherein the control device stores a plurality of values corresponding to oil temperatures of the oil as the current command value, and wherein the control device provides the energization control of the electromagnetic coil based on the current command value corresponding to the oil temperature of the oil to engage the dog clutch of the one connecting/disconnecting device and updates the current command value corresponding to the oil temperature of the oil at the time of learning of the characteristic value.

12. The four-wheel drive vehicle according to claim 11, wherein the characteristic value is the increase rate of the rotation speed of the first rotating member increased at the time of engagement of the dog clutch of the one connecting/disconnecting device from when the energization control is started until when a predetermined time period set in advance has elapsed.

13. The four-wheel drive vehicle according to claim 11, wherein the characteristic value is an elapsed time at the time of engagement of the dog clutch of the one connecting/disconnecting device from when the energization control is started until when the rotation speed of the first rotating member increases to a predetermined speed set in advance.

14. The four-wheel drive vehicle according to claim 11, wherein the control device updates each of the plurality of the current command values corresponding to the oil temperatures of the oil based on the learned characteristic value.

15. The four-wheel drive vehicle according to claim 14, wherein the characteristic value is the increase rate of the rotation speed of the first rotating member increased at the time of engagement of the dog clutch of the one connecting/disconnecting device from when the energization control is started until when a predetermined time period set in advance has elapsed.

16. The four-wheel drive vehicle according to claim 14, wherein the characteristic value is an elapsed time at the time of engagement of the dog clutch of the one connecting/disconnecting device from when the energization control is started until when the rotation speed of the first rotating member increases to a predetermined speed set in advance.

17. The four-wheel drive vehicle according to claim 1, wherein the characteristic value is the increase rate of the rotation speed of the first rotating member increased at the time of engagement of the dog clutch of the one connecting/disconnecting device from when the energization control is started until when a predetermined time period set in advance has elapsed.

18. The four-wheel drive vehicle according to claim 1, wherein the characteristic value is an elapsed time at the time of engagement of the dog clutch of the one connecting/disconnecting device from when the energization control is started until when the rotation speed of the first rotating member increases to a predetermined speed set in advance.

* * * * *